US008566548B2

(12) United States Patent
Sakaguchi et al.

(10) Patent No.: US 8,566,548 B2
(45) Date of Patent: *Oct. 22, 2013

(54) VOLUME SELECTION METHOD AND INFORMATION PROCESSING SYSTEM

(75) Inventors: Akihiko Sakaguchi, Tachikawa (JP); Fuming Liu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,684

(22) Filed: Aug. 2, 2012

(65) Prior Publication Data

US 2012/0303783 A1 Nov. 29, 2012

Related U.S. Application Data

(63) Continuation of application No. 13/017,703, filed on Jan. 31, 2011, now abandoned, which is a continuation of application No. 11/594,736, filed on Nov. 9, 2006, now Pat. No. 7,941,625.

(30) Foreign Application Priority Data

Sep. 29, 2006 (JP) .................. 2006-266372

(51) Int. Cl.
G06F 12/02 (2006.01)
(52) U.S. Cl.
USPC .......................... 711/165; 711/162
(58) Field of Classification Search
USPC ................................. 711/162, 165
See application file for complete search history.

(56) References Cited

U.S. PATENT DOCUMENTS

| 6,092,066 | A | 7/2000 | Ofek |
| 7,096,336 | B2 | 8/2006 | Furuhashi et al. |
| 7,191,198 | B2 | 3/2007 | Asano et al. |
| 7,337,353 | B2 | 2/2008 | Yamamoto et al. |
| 7,467,143 | B2 | 12/2008 | Nojima |
| 7,502,904 | B2 | 3/2009 | Furuhashi et al. |
| 7,603,583 | B2 | 10/2009 | Yamamoto et al. |
| 7,730,275 | B2 | 6/2010 | Furuhashi et al. |
| 7,930,506 | B2 | 4/2011 | Furuhashi et al. |
| 2004/0123063 | A1 | 6/2004 | Dalal et al. |
| 2004/0243692 | A1 | 12/2004 | Arnold et al. |

(Continued)

FOREIGN PATENT DOCUMENTS

| JP | 11-232041 | 8/1999 |
| JP | 2005-115438 | 10/2003 |
| JP | 2004-334561 | 11/2004 |
| JP | 2005-050007 | 2/2005 |
| JP | 2005-196625 | 7/2005 |

(Continued)

OTHER PUBLICATIONS

Grosklags C. et al., Fibre Channel for high-speed, high-capacity data storage, VMEbus Systems, Aug. 2006, [online] retreived from internet Aug. 28, 2006 [url: http://www.vmecritical.com/pdfs/Vmetro.Aug06.pdf], pp. 1-4.

(Continued)

*Primary Examiner* — Jared Rutz
(74) *Attorney, Agent, or Firm* — Foley & Lardner LLP

(57) ABSTRACT

In a storage management system in which a storage apparatus is connected via a network to a volume allocation management server having a performance requirement analysis unit, a volume allocation unit, and a volume performance determining unit, the performance requirements of a business application using volume-allocating data and the performance characteristics of a volume serving as a data storage destination are determined, and on the basis of the resulting information, a volume which satisfies the performance requirements is selected as the data storage destination.

4 Claims, 28 Drawing Sheets

(56) References Cited

U.S. PATENT DOCUMENTS

| | | |
|---|---|---|
| 2005/0027754 A1 | 2/2005 | Gajjar et al. |
| 2005/0154821 A1 | 7/2005 | Furuhashi et al. |
| 2006/0010289 A1 | 1/2006 | Takeuchi et al. |
| 2006/0095697 A1 | 5/2006 | Eguchi et al. |
| 2006/0143418 A1 | 6/2006 | Takahashi et al. |
| 2006/0236048 A1 | 10/2006 | Deguchi et al. |
| 2006/0259686 A1 | 11/2006 | Sonobe |
| 2007/0022142 A1 | 1/2007 | Palmer et al. |

FOREIGN PATENT DOCUMENTS

| | | |
|---|---|---|
| JP | 2005-301971 | 10/2005 |
| JP | 2005-326935 | 11/2005 |
| JP | 2006-099748 A | 4/2006 |

OTHER PUBLICATIONS

Schindler, Jiri, Matching Application Access Patterns to Storage Device Characteristics, [retrieved from internet on Aug. 28, 2009] [url: http://www.pdl.cmu.edu/PDL-FTP/Database/CMU-PDL-03-109.pdf] pp. 1-196.

FIG. 6

| 601 | 602 | 603 | 604 | 600 |
|---|---|---|---|---|
| BUSINESS APPLICATION | LOGICAL VOL | COMMAND | TIME | |
| APP1 | VOL11 | WRITE | 20060801000000 | |
| APP1 | VOL11 | READ | 20060801000101 | |
| ... | ... | ... | ... | |
| APP 2 | VOL12 | WRITE | 20060801012003 | |
| ... | ... | ... | ... | |
| APP1 | VOL13 | WRITE | 20060802120004 | |
| ... | ... | ... | ... | |

FIG. 7

| 701 | 702 | 703 | 704 | 705 | 700 |
|---|---|---|---|---|---|
| BUSINESS APPLICATION INFORMATION BUSINESS APPLICATION NAME/MANUFACTURING SOURCE | LOGICAL VOL | OPERATION START TIME | UPDATE TIME | ACCESS PATTERN | |
| APP1/A COMPANY | VOL11 | 20060801000000 | 1HOUR | CONCENTRATED | |
| APP2/B COMPANY | VOL22 | 20060801012003 | 1MONTH | DISPERSED | |

FIG. 8

| HOST 801 | BUSINESS APPLICATION 802 | CLASSIFICATION 803 | OPERATION START TIME 804 | UPDATE TIME 805 | ACCESS PATTERN 806 | EVALUATION VALUE 807 | LOGICAL VOL 808 |
|---|---|---|---|---|---|---|---|
| 001 | APP1 | BUSINESS SYSTEM | 20060801000000 | 1HOUR | CONCENTRATED | | VOL11 |
| 001 | APP2 | MAIL SERVER | 20060801101203 | 1MONTH | DISPERSED | | VOL12 |
| 002 | APP3 | ARCHIVE | | | | | |
| 003 | APP3 | ARCHIVE | 20050701101203 | 1YEAR | ONE-SHOT | | VOL14 |
| ... | ... | ... | ... | ... | ... | ... | ... |

FIG. 11

| VOL 1101 | RELATED VOL 1102 | STORAGE APPARATUS 1103 | ALLOCATION CONDITION 1104 | CAPACITY 1105 | ROTATION SPEED 1106 | RAID LEVEL 1107 | DISK TYPE 1108 | RESPONSE SPEED 1109 | ACCESS FREQUENCY 1110 | EVALUATION VALUE 1111 |
|---|---|---|---|---|---|---|---|---|---|---|
| 11 |  | 01 | ALLOCATED | 1G | 1500 | RAID5 | FC | 10ms |  |  |
| 12 |  | 01 | ALLOCATED | 1G | 1500 | RAID5 | FC | 10ms |  |  |
| 13 |  | 01 | NOT ALLOCATED | 1G | 0 |  | FM | 50ms |  |  |
| 14 |  | 01 | NOT ALLOCATED | 1G | 0 |  | FM | 50ms | 1000 |  |
| 15 |  | 01 | NOT ALLOCATED | 1G | 1500 | RAID0 | FC | 50ms |  |  |
| 16 |  | 01 | ALLOCATED | 1G | 1500 | RAID0 | FC | 10ms |  |  |
| ... |  | ... | ... | ... | ... | ... | ... | ... | ... | ... |
| 20 | 11 | 02 | ALLOCATED | 1G | 1500 | RAID0 | FC | 10ms |  |  |
| 21 | 12 | 02 | ALLOCATED | 1G | 1200 | RAID0 | SATA | 100ms |  |  |
| 22 |  | 02 | NOT ALLOCATED | 1G | 1200 | RAID0 | SATA | 100ms |  |  |
| 23 |  | 02 | NOT ALLOCATED | 1G | 1500 | RAID5 | SATA | 100ms |  |  |
| 24 |  | 02 | ALLOCATED |  | 1500 | RAID5 | SATA | 100ms |  |  |
| 25 |  | 02 | ALLOCATED |  | 1500 | RAID5 | SATA | 100ms |  |  |
| ... |  | ... | ... | ... | ... | ... | ... | ... | ... | ... |

1100

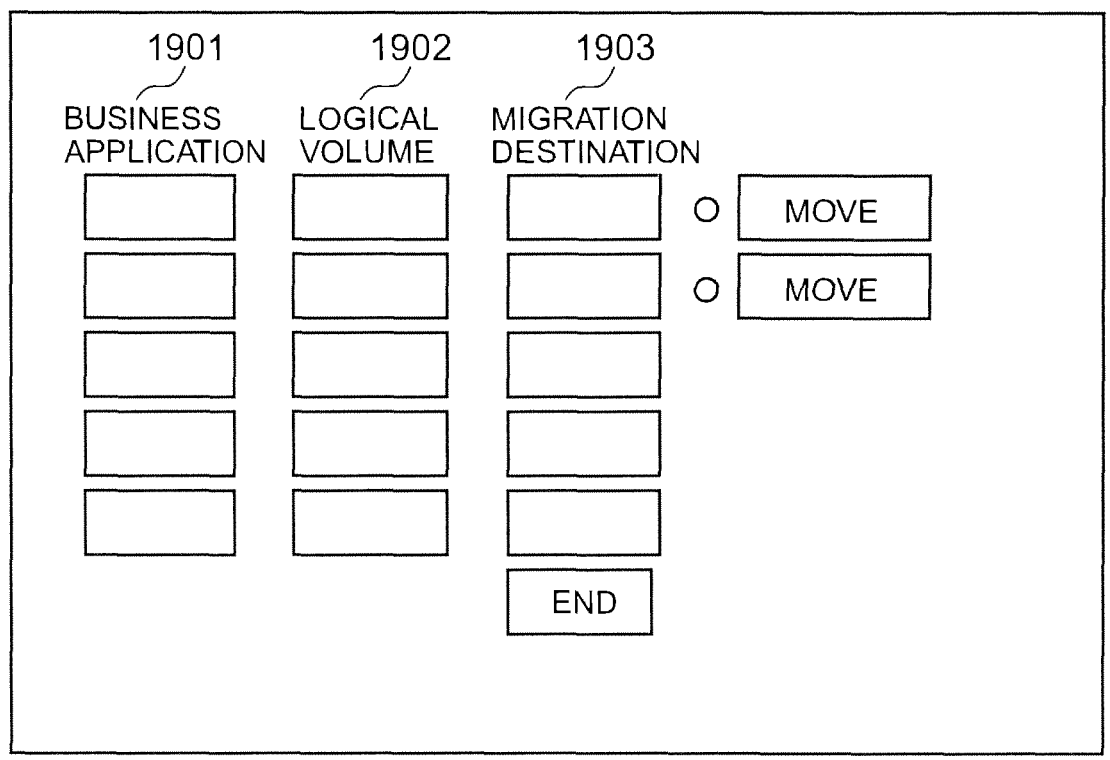

FIG. 20

| TASK | VOLUME GROUP | VOLUME SEARCH CONDITION | TASK EXECUTION TIMING | SOURCE VOLUME | TARGET VOLUME |
|---|---|---|---|---|---|
| TASK1 | GROUP1 | | EXECUTE IMMEDIATELY | VOLL11 | VOLL15 |
| TASK2 | | TIER #0 | EXECUTE IMMEDIATELY | VOLL19 | VOLL23 |

| VOLUME GROUP | LOGICAL VOLUME |
|---|---|
| VOLUME GROUP1 | VOL19 |
| VOLUME GROUP2 | VOL12  VOL16 |
| VOLUME GROUP3 | |

| VOLUME SEARCH CONDITION 2601 | SEARCH CONDITION 2602 | 2600 |
|---|---|---|
| TIER #0 | ARRAY GROUP = "2-2-1" | |
| TIER #1 | DISK TYPE = "ATA" | |
| TIER #2 | DISK TYPE = "FC" | |

FIG. 31

| | 3101 | 3102 | 3103 | 3104 | 3100 |
|---|---|---|---|---|---|
| | COPY | PRIMARY LOGICAL VOLUME | SECONDARY LOGICAL VOLUME | COPY FORMAT | |
| | COPY1 | VOL17 | VOL25 | SYNCHRONOUS | |
| | COPY2 | VOL18 | VOL30 | ASYNCHRONOUS | |
| | | | | | | ns
VOLUME SELECTION METHOD AND INFORMATION PROCESSING SYSTEM

CROSS-REFERENCE TO RELATED PATENT APPLICATIONS

Japan Priority Application 2006-266372, filed Sep. 29, 2006 including the specification, drawings, claims and abstract, is incorporated herein by reference in its entirety. This application is a Continuation of U.S. application Ser. No. 13/017,703, filed Jan. 31, 2011, now abandoned, incorporated herein by reference in its entirety, which is a Continuation of U.S. application Ser. No. 11/594,736, filed Nov. 9, 2006, issued May 10, 2011 as U.S. Pat. No. 7,941,625 incorporated herein by reference in its entirety.

BACKGROUND OF THE INVENTION

1. Field of the Invention

The present invention relates to a technique, performed in an information processing system connecting a plurality of hosts and storage apparatuses, of selecting a storage area for storing the data of a host from a plurality of storage areas provided by the storage apparatuses, and storing the data in the selected storage area.

2. Description of the Related Art

With recent increases in the amount of data handled by business enterprises, the size of storage apparatuses is also increasing. As the size of a storage apparatus increases, the performance of the individual volumes in the storage apparatus is not uniform, and instead, volumes having various performance levels are mixed together. It is therefore important to dispose the volumes in an optimum arrangement such that the data handled by the business enterprise are stored according to importance and so on. Furthermore, data migration is often required due to variation over time in the importance of the data, storage apparatus replacement, and so on, and it is important to select an optimum volume having performance and reliability levels which correspond to the importance of the data, rather than simply selecting any empty volume.

In Japanese Patent Application Publication 2005-115438, the volume load is monitored, and when the load exceeds a predetermined level, the volume is moved. In so doing, an optimum arrangement is provided in terms of the volume load, and the volume load can be evened out through data movement.

SUMMARY OF THE INVENTION

However, in the prior art described above, the importance of the data content is not evaluated, and regardless of the data type, the data become subject to movement whenever the load on the volume rises. Furthermore, selection of the movement destination volume and the characteristics of this volume are not taken into account, and only the access load is determined. As a result, important data requiring a high access performance may be moved to a low speed volume, or conversely, archive data to which the access performance is unimportant may be moved to a high speed volume.

The present invention has been designed in consideration of these problems, and it is an object thereof to ensure that a storage area of a storage apparatus which satisfies the performance requirements of data can be used.

The performance of an application executed by a host computer is determined from operation information relating to the application, and the performance of each storage area provided in a storage apparatus is determined from the attributes of the storage areas. A storage area which satisfies the performance of the application is specified, and the specified storage area is allocated to the host computer on which the application is executed.

BRIEF DESCRIPTION OF THE DRAWINGS

FIG. 6 shows an operation information table;
FIG. 7 shows a performance information table;
FIG. 8 shows a business application management table;
FIG. 11 shows a logical volume management table;
FIG. 18 shows a monitoring table;
FIG. 19 shows an example of result display;
FIG. 20 shows a task execution management table;
FIG. 26 shows a volume search condition management table;
FIG. 31 is a view showing a logical volume pair defining table.

DETAILED DESCRIPTION OF THE PREFERRED EMBODIMENT

Figure 1:
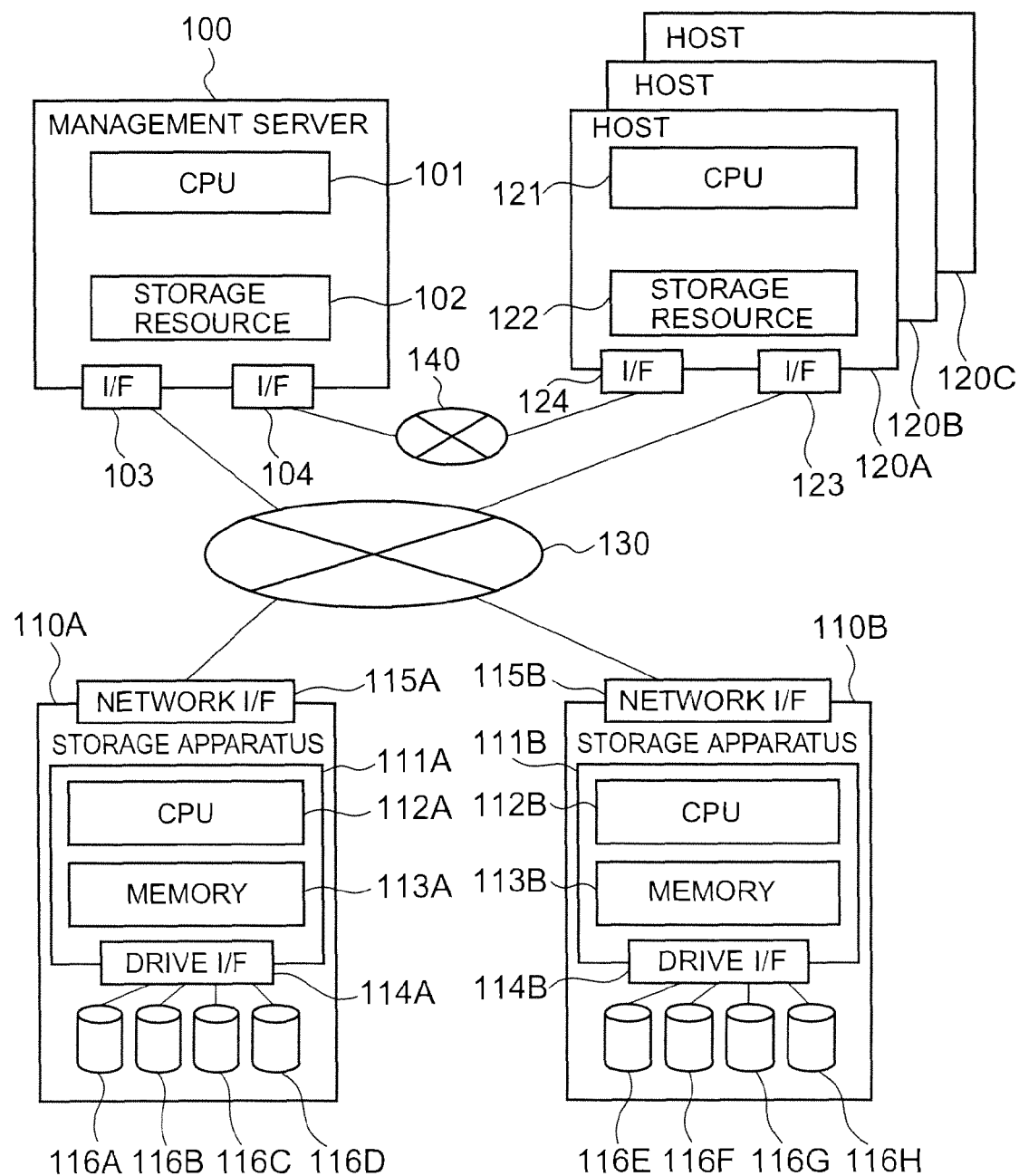
FIG. 1 is a view showing the constitution of an information processing system.

FIG. 1 shows the constitution of an information processing system.

In the information processing system, a management server 100, a plurality of storage apparatuses 110, and a plurality of hosts 120 are connected to a network 130. The management server 100 and the plurality of hosts 120 are also connected to a network 140. The network 130 and the network 140 may be any type of network. For example, the networks 130 and 140 may both be constituted by IP networks, or they may be constituted by different types of network such that the network 130 is a SAN (Storage Area Network) and the network 140 is an IP network.

The management server 100 manages programs executed by the hosts 120 and states of the storage apparatuses 110. The management server 100 also issues an instruction to the storage apparatus 110 to move (migrate) data between logical volumes (logical storage areas) set in the storage apparatus 110. The management server 100 comprises various computer programs, semiconductor memory capable of storing control information and the like, a storage resource 102 such as a hard disk drive, a CPU 101 for reading a computer program, control information, data, and so on from the storage resource 102 and executing same, at least one network interface 103 serving as an interface with the communication network 130, and a network interface 104 serving as an interface with the communication network 140.

Each host 120 is a computer which issues an input/output command for reading and writing data from/to a logical volume of the storage apparatus 110. The hosts 120 may have identical or different hardware constitutions. Here, assuming that the hosts 120 all have identical hardware constitutions, a host 120A will be described as an example.

The host 120A comprises a storage resource 122, such as semiconductor memory or a hard disk drive, which is capable of storing various computer programs, a CPU 121 for reading a computer program from the storage resource 122 and executing the computer program, at least one network interface 123 serving as an interface with the communication network 130, and a network interface 124 serving as an interface with the communication network 140.

Each storage apparatus 110 comprises a plurality of disk apparatuses 116 for storing data, and serves as an apparatus for writing data to the disk apparatuses 116 and reading data from the disk apparatuses 116 in accordance with an input/output command from the host 120. The storage apparatuses 110 may have identical or different hardware constitutions. Here, assuming that the storage apparatuses 110 all have identical hardware constitutions, a storage apparatus 110A will be described as an example.

The storage apparatus 110A comprises the plurality of disk apparatuses 116, and is capable of forming a RAID (Redundant Array of Independent Disks). Note that a semiconductor storage apparatus such as flash memory, RAM, or ROM may be used instead of the disk apparatuses 116. Unlike a disk apparatus, a semiconductor storage apparatus has no mechanical parts, and is therefore superior in terms of vibration, noise, power consumption, and response speed. Both a disk apparatus and a semiconductor storage apparatus may be provided. For example, by providing both a disk apparatus and a non-volatile semiconductor storage apparatus, the disk apparatus may be used when a large amount of writing is performed, and the non-volatile semiconductor storage apparatus may be used when a large amount of reading is performed. Since a semiconductor storage apparatus is superior to a disk apparatus in terms of vibration and so on, it may be used without forming a RAID system.

In addition to the plurality of disk apparatuses 116, the storage apparatus 110A comprises a controller 111A.

The controller 111A is an apparatus for controlling an operation of the storage system 110A. The controller 111A comprises a network interface 115A relating to the communication network 130, a drive interface 114A relating to the disk apparatuses 116, a CPU 112A, and memory 113A. The CPU 112A and memory 113A may be provided singly or in pluralities. For example, the memory 113A may comprise a cache area capable of temporarily storing data exchanged between the storage apparatus 116 and host 120, a control area capable of storing data and a computer program for controlling the storage apparatus 110A, and so on. The CPU 112A is capable of reading the computer program from the control area and executing the computer program.

Figure 2:
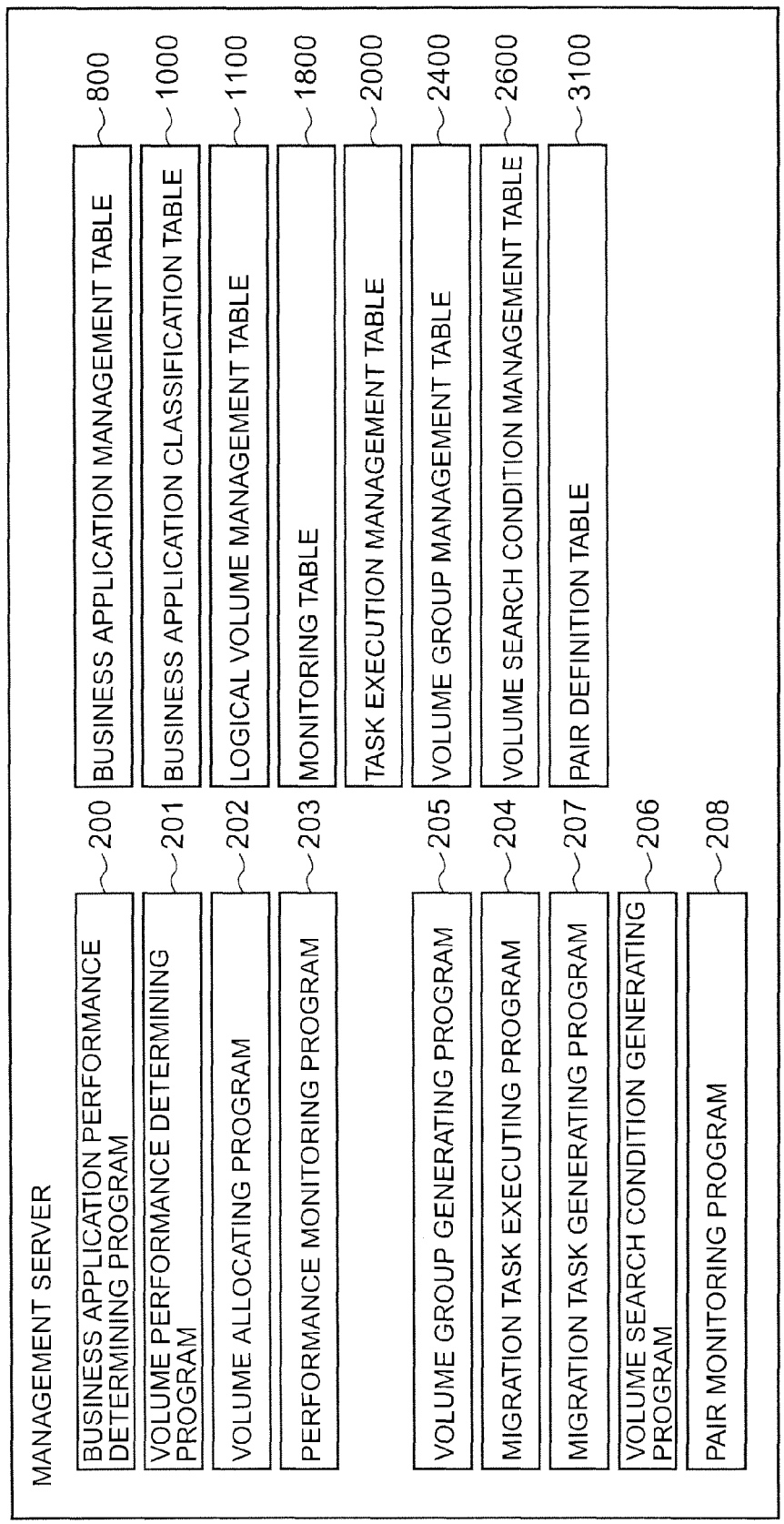
FIG. 2 is a view showing the constitution of a management server.

FIG. 2 shows the constitution of the management server, and more specifically programs and data provided in the management server.

The storage resource 102 of the management server 100 stores a business application performance determining program 200, a volume performance determining program 201, a volume allocating program 202, a performance monitoring program 203, a migration task executing program 204, a volume group generating program 205, a volume search condition generating program 206, a migration task generating program 207, a pair monitoring program 208, and the data required to execute each program. The data required to execute the programs are stored in association, and to facilitate understanding of these associations, they are illustrated here in the form of tables. As shown in FIG. 2, the tables comprise a business application management table 800, a business application classification table 1000, a logical volume management table 1100, a monitoring table 1800, a task execution management table 2000, a volume group management table 2400, a volume search condition management table 2600, and a pair defining table 3100.

Figure 3:
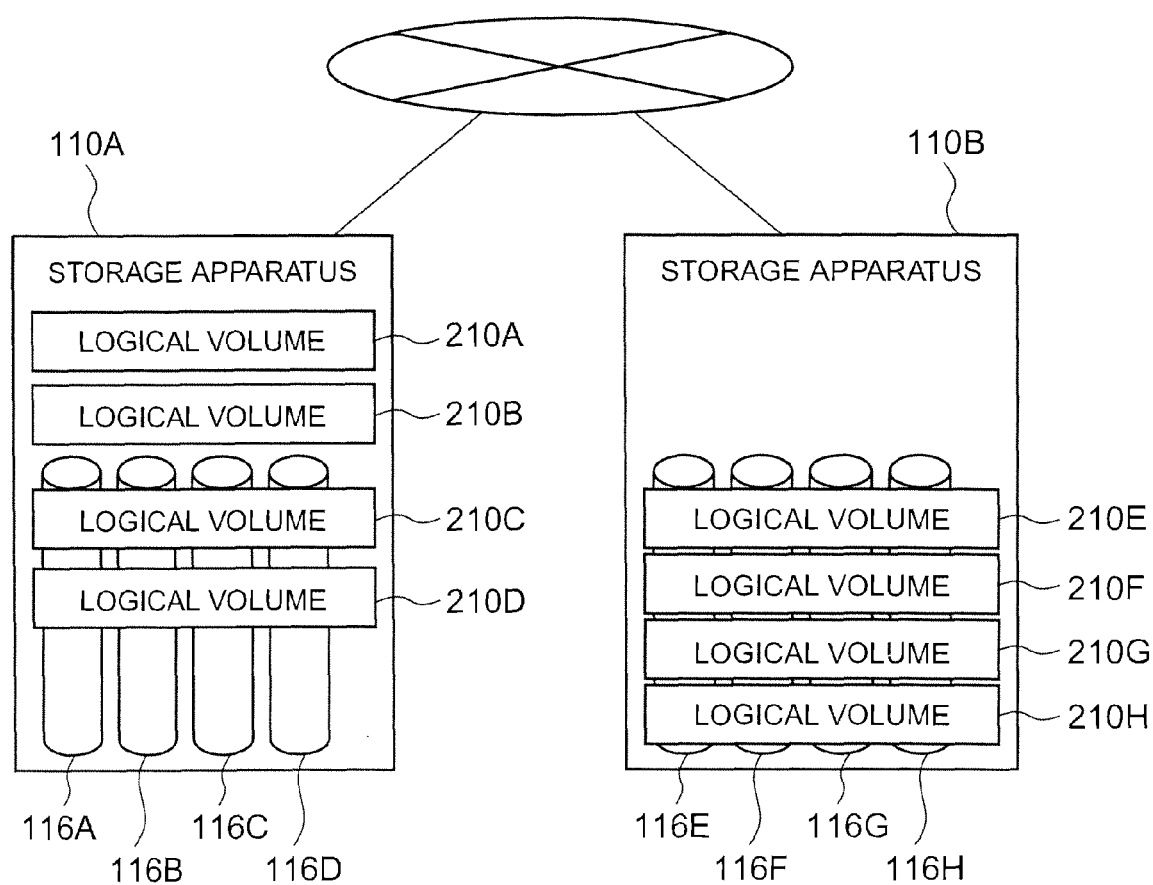
FIG. 3 is a view showing the constitution of a storage apparatus.

FIG. 3 shows the constitution of the storage apparatus.

The controller 111 of the storage apparatus 110 is capable of forming a logical volume 210, which is a logical storage area accessed by the host 120. The controller 111 is capable of associating the logical volume 210 with a physical storage area provided by the disk apparatus 116 and a logical volume provided by another storage apparatus. For example, logical volumes 210C, 210D are associated with the physical storage areas provided by the disk apparatus 116. Further, logical volumes 210A, 210B are associated with logical volumes 210E, 210F of a storage apparatus 110B, and logical volumes 210E to 210H are associated with the disk apparatus 116 of the storage apparatus 110B. Hence, when the host 120 accesses the logical volume 210C or the logical volume 210D, the physical storage area of the disk apparatus 116 in the storage apparatus 110A is accessed. On the other hand, when the host 120 accesses the logical volumes 210A, 210B, the controller 111A of the storage apparatus 110A transfers the access from the host 120 to the storage apparatus 110B as access relating to the logical volumes 210E, 210F. A controller 111B of the storage apparatus 110B then accesses the physical storage area of the disk apparatus 116 as access relating to the logical volumes 210E, 210F. Thus, access relating to the logical volumes 210A, 210B becomes access relating to the logical volumes 210E, 210F, and as a result, the disk apparatus 116 of the storage apparatus 110B is accessed.

Data migration (movement) within this constitution will now be described.

FIG. 4 shows an example of data migration.

Upon reception of a migration source logical volume, a migration destination logical volume, and a data migration instruction from the management server 100, the controller 111A migrates data from the migration source logical volume to the migration destination logical volume, and then modifies an identifier of the logical volume.

Figure 4A:
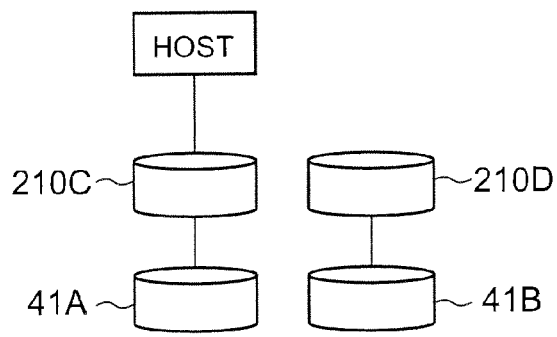
FIG. 4 is a view showing an example of data migration.

FIG. 4A shows a state prior to data migration. Here, the host 120 is associated with the logical volume 210C, and the logical volume 210C is associated with a physical storage area 41A of the disk apparatus 116 in the storage apparatus 110A. The logical volume 210D is associated with a physical storage area 41B of the disk apparatus 116.

Figure 4B:
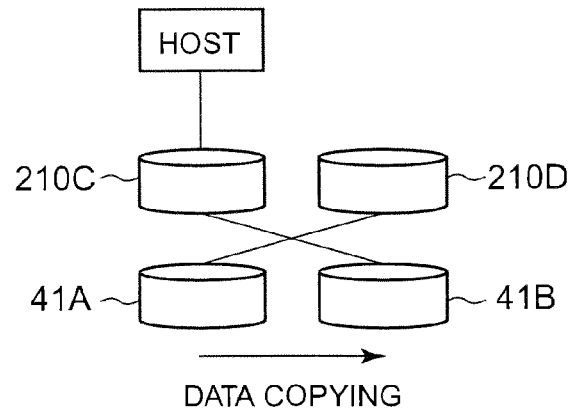

FIG. 4B shows a data migration state.

In the state shown in FIG. 4A, when a data migration instruction is received from the management server 100 indicating the logical volume 210C as the migration source and the logical volume 210D as the migration destination, the controller 111A copies the data stored in the storage area 41A to the storage area 41B, and when copying is complete, associates the storage area 41A with the logical volume 210D and the storage area 41B with the logical volume 210C. Thus, the physical data storage position can be changed without altering the associations between the host 120 and the logical volumes.

Note that FIG. 4 shows data migration between the logical volumes 210C, 210D, but data migration between the logical volumes 210A, 210B can be performed similarly.

In FIG. 3, for example, when the data stored in the logical volume 210A are to be migrated to the logical volume 210B, the data stored in the logical volume 210E may be copied to the logical volume 210F, and when copying is complete, the associations between the logical volumes 210A, 210B and the logical volumes 210E, 210F may be modified. In this case, only the associations between the logical volumes 210E, 210F and the physical storage area need be modified.

Data migration can be performed similarly between the logical volume 210A and the logical volume 210C.

Note that the data migration described above includes both a case in which the data are deleted from the storage area of the migration source (copy source) following migration, and a case in which the data are not deleted.

Figure 5:
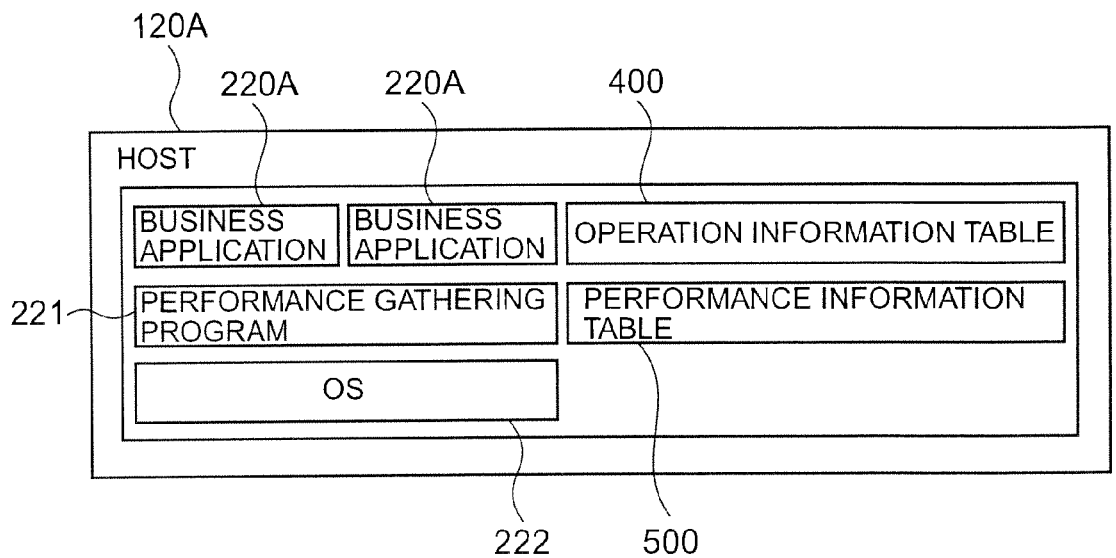
FIG. 5 is a view showing the constitution of a host.

FIG. 5 shows the constitution of the host, or more specifically, the programs and data provided in the host.

The storage resource 122 of each host 120 stores one or a plurality of business application programs (to be abbreviated to "business applications" hereafter) 220, a performance gathering program 221, an operating system (OS) 222, and an operation information table 400 and a performance information table 500 that are used by these programs. The CPU 121 executes the programs stored in the storage resource 122.

The processing of this system will now be described.

First, the processing of the host 120 will be described.

The business application 220 is an application program for performing an online service such as a Web service, a work vacation management service, or bank deposit and balance referral, for example. The business application 220 provides this service by issuing an input/output command to the logical volume 210 of the storage apparatus 110. Further, when an access request relating to the storage apparatus is issued, each business application 220 stores the corresponding information as a log in the operation information table 400.

FIG. 6 shows the operation information table.

The operation information table stores a business application 601, a write or read destination logical volume 602, a command 603 indicating writing or reading, and a command issue time 604 in association with each other. Note that the time includes date information.

FIG. 7 shows the performance information table.

The performance information table stores business application information 701, a logical volume 702, an operation start time 703, an update time 704, and an access pattern 705 in association with each other. The business application information 701 includes a business application name and information regarding the manufacturing source of the business application. The business application information 701 is set by a host manager. The update time 704 and the access pattern 705 are set by the performance gathering program 221. Note that when a storage area of the storage apparatus is not allocated to the business application, the business application is not operative, and therefore nothing is set in the operation start time 703, the update time 704, and the access pattern 705.

The performance gathering program 221 sets the update time 704 and access pattern 705 of the performance information table in accordance with the following definitions by referring to the operation information table at fixed intervals.

(Definitions)

Operation start time: time of initial access

Update time: time from last access of business application to current time

Access pattern

One-shot: no more than 500 accesses in one month

Dispersed: no less than 500 and no more than 1000 accesses in one day

Concentrated: no less than 500 accesses in one hour

These definitions may be stored in the storage resource 122 of the host 120 as a definition file such that the definition file is read and executed by the performance gathering program 221, or the definition file may be defined in the performance gathering program 221 itself. The settings of the definition file may be modified freely, and therefore the access patterns may be tabulated according to the number of writing accesses, for example. If the definition file is transmitted from the management server 100 to the host 120, the items and content to be tabulated by the management server 100 can be determined freely.

Further, the business application information 701 of the performance information table 700 is set by the host manager, but by having the performance gathering program 221 communicate with the OS 222, the installed business applications may be gathered from the OS and then set.

Upon reception from the management server 100 of a transmission request relating to an item set in the performance information table 700, the performance gathering program 221 transmits the item to the management server 100. As noted above, when another item has been tabulated in the definition file, information regarding this item is also transmitted to the management server 100.

Next, the processing of the management server 100 will be described.

FIG. 8 shows the business application management table.

A host 801, a business application 802, a classification 803, an operation start time 804, an update time 805, an access pattern 806, an evaluation value 807, and a logical volume 808 are set in association with each other in the business application management table 800.

The business application 802, operation start time 804, update time 805, and access pattern 806 are set by gathering the information that is set in the performance information table 700 of each host 120.

Figure 9:
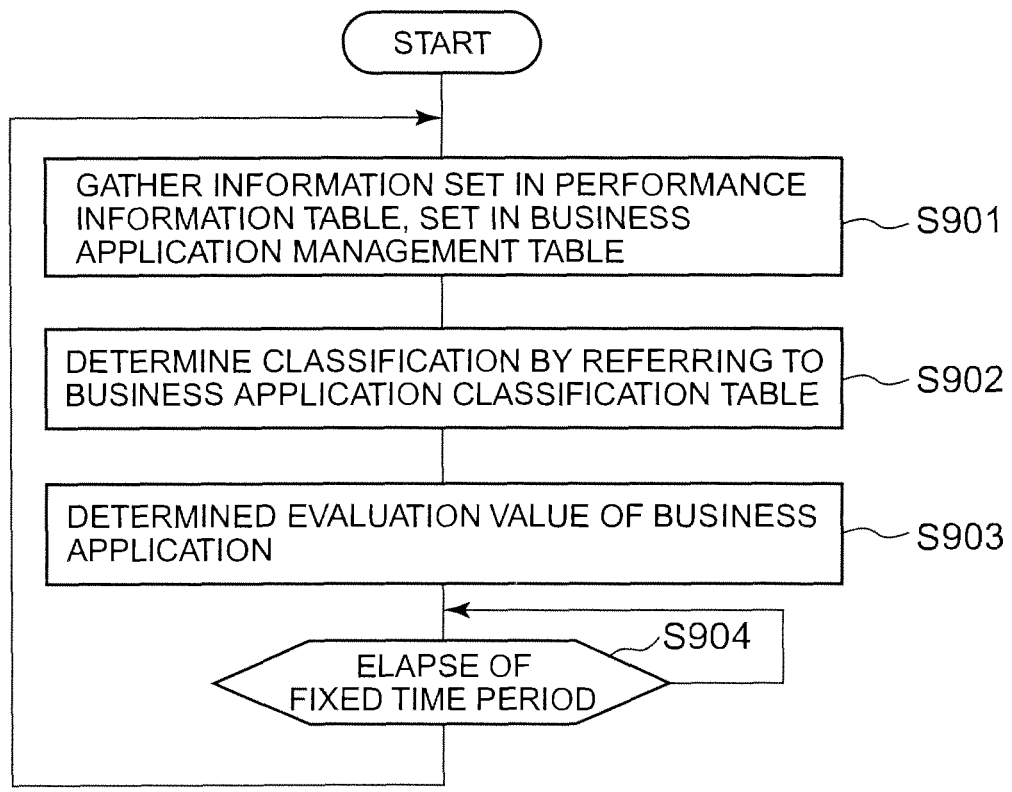
FIG. 9 shows the processing of a business application performance determining program.

FIG. 9 shows the processing of the business application performance determining program.

Figure 10:
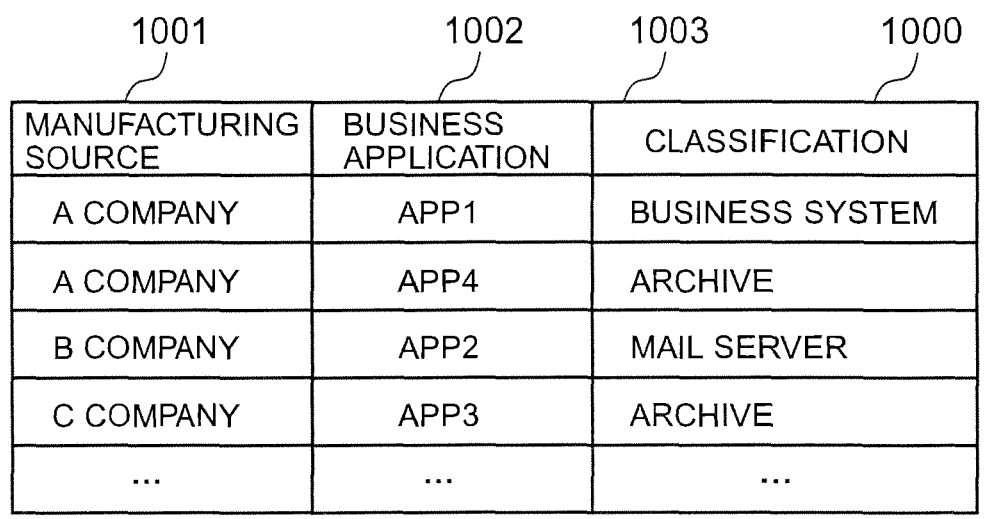
FIG. 10 shows a business application classification table.

The business application performance determining program 200 gathers the information set in the performance information table of each host 120 at fixed intervals, and sets the gathered information in the business application management table 800 (S901). Next, the classification of the business application is set by referring to the business application classification table 1000 shown in FIG. 10 (S902). The business application classification table 1000 stores a business application manufacturing source 1001, a business application 1002, and a classification 1003 in association with each other, and is stored in the storage resource 102 of the management server 100. The business application classification table 1000 is set by the manager.

Next, an evaluation value relating to the business application is determined from evaluation values defined in relation to each item (S903).

The evaluation values of each item are set as follows, for example.

Operation start time: when operation start time is within one hour, A=1, B=0.5, and when operation start time is equal to or greater than one hour, A=0.2, B=1

Classification: archive=0, mail server=1, business system=2

Update time: one year=0, one month=1, one day=3

Access pattern: one-shot=0, dispersed=1, concentrated=2

Here, setting is performed such that the value rises as the access frequency increases.

Using these definitions, $APi = A \times classification$ evaluation value $+ B \times (update\ time\ evaluation\ value + access\ pattern\ evaluation\ value)$ is determined for each business application, whereupon the evaluation values are divided into five groups between a maximum value and a minimum value, and a corresponding level is determined for each group. For example, the business application evaluation values are determined such that when the minimum value is 0 and the maximum value is 5, $0 \leq APi \leq 1$ corresponds to a level 1, $1 < APi \leq 2$ corresponds to a level 2, $2 < APi \leq 3$ corresponds to a level 3, $3 < APi \leq 4$ corresponds to a level 4, and $4 < APi \leq 5$ corresponds to a level 5. The determined evaluation value is set as the evaluation value 807.

Note that the evaluation value of each item may be defined freely. Furthermore, by employing the operation start time, the classification of an inoperative business application or a business application that has just become operative can be emphasized, while operation information such as the update time and access pattern is emphasized with respect to a business application that has been operative for a certain amount of time. Note that the business application evaluation value determined here is not limited to the example described above, and may be determined using another method.

After a fixed amount of time has elapsed (Y in S904), the business application performance determining program returns to S901 and continues the processing.

FIG. 11 shows the logical volume management table.

In the logical volume management table 1100, a logical volume (VOL) 1101, a related volume (related VOL) 1102, a storage apparatus 1103, an allocation condition 1104, a capacity 1105, a rotation speed 1106, a RAID level 1107, a disk type 1108, a response speed 1109, an access frequency 1110, and an evaluation value 1111 are stored in association with each other. This information is stored in the storage resource 102 of the management server 100.

The logical volume 1101 is set with a logical volume identifier, and the related volume 1102 is set when an association is established between logical volumes, such as the logical volume 210A and the logical volume 210E shown in FIG. 3. The storage apparatus 1103 denotes the storage apparatus in which the logical volume is set. The allocation condition 1104 is set to "allocated" when the logical volume is allocated to a host or business application, and to "not allocated" when the logical volume has not yet been allocated. The capacity 1105 indicates the capacity of the logical volume, and the rotation speed 1106 indicates the rotation speed of the disk apparatus serving as the physical storage area of the logical volume. Note that when the physical storage area is constituted by semiconductor memory, 0 is set as the rotation speed. The RAID level 1107 is a value between RAID0 and RAID5, and the disk type 1108 indicates the medium type of the physical storage area. Here, FC denotes a disk apparatus corresponding to a fiber channel loop, and FM denotes flash memory, i.e. semiconductor memory. The response speed 1109 and access frequency 1110 show the response speed and access frequency of the logical volume. The evaluation value 1111 is set by the volume performance determining program 201.

Figure 12:
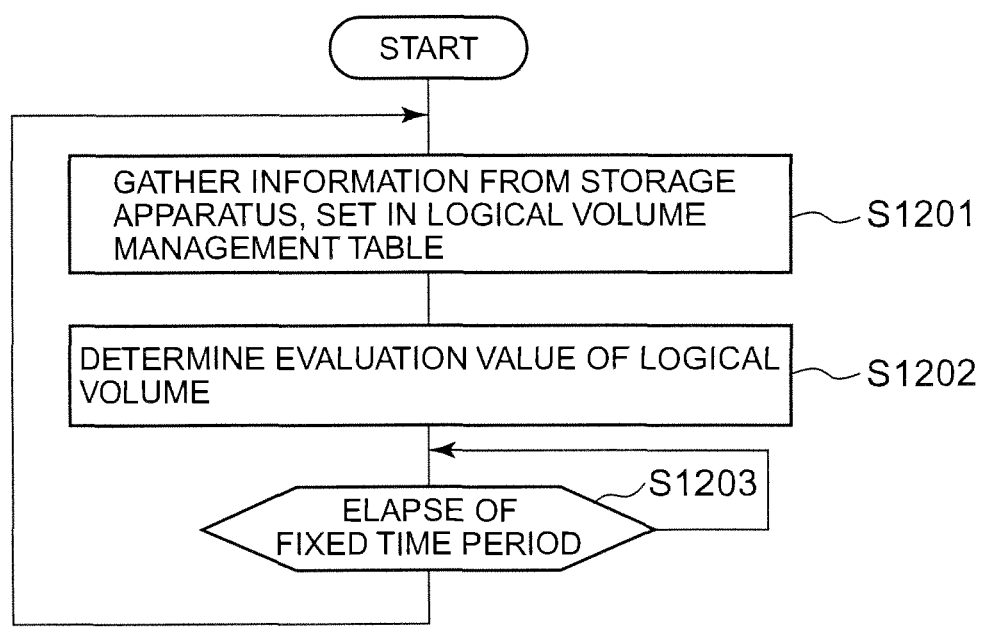
FIG. 12 shows the processing of a volume performance determining program.

FIG. 12 shows the processing of the volume performance determining program.

The volume performance determining program 201 gathers information such as the capacity, rotation speed, RAID level, disk type, response speed, and access frequency of each logical volume from each storage apparatus at fixed intervals, and sets the gathered information in the logical volume management table 1100 (S1201).

Next, an evaluation value is determined for the determined items, and thus an evaluation value relating to each logical volume is determined (S1202).

The evaluation values of each item are set as follows, for example.

Rotation speed: 0=3, greater than 0 and no greater than 10000=0, greater than 10000 and no greater than 15000=1, greater than 15000=2

Disk type: ATA=0, FC=1, semiconductor memory=2

RAID level: RAID0=0, RAID1=2, RAID3=3, RAID4=4, RAID5=5

Here, the value is set higher as the performance and reliability increase.

Using these definitions, $VOLi = $ rotation speed evaluation value $+$ disk type evaluation value $+$ RAID level evaluation value is determined for each logical volume, whereupon the evaluation values are divided into five groups between a maximum value and a minimum value, and a corresponding level is determined for each group. For example, the logical volume evaluation values are determined such that when the minimum value is 0 and the maximum value is 5, $0 \leq VOLi \leq 1$ corresponds to a level 1, $1 < VOLi \leq 2$ corresponds to a level 2, $2 < VOLi \leq 3$ corresponds to a level 3, $3 < VOLi \leq 4$ corresponds to a level 4, and $4 < VOLi \leq 5$ corresponds to a level 5. The determined evaluation value is set as the evaluation value 1111.

Note that the evaluation value of each item may be defined freely. Also note that the logical volume evaluation value determined here is not limited to the example described above, and may be determined using another method.

After a fixed amount of time has elapsed (Y in S1203), the volume performance determining program 201 returns to S1201 and continues the processing.

The business application evaluation value and the logical volume evaluation value are determined in the manner described above. Note that the respective maximum values and minimum values of the evaluation values preferably match. Further, when determining the evaluation value, the response speed and access frequency are not taken into account, but by setting evaluation values for these items, these items can also be taken into account when determining the logical volume evaluation value.

Next, processing to allocate a logical volume to the business application 220 will be described.

Figure 13:
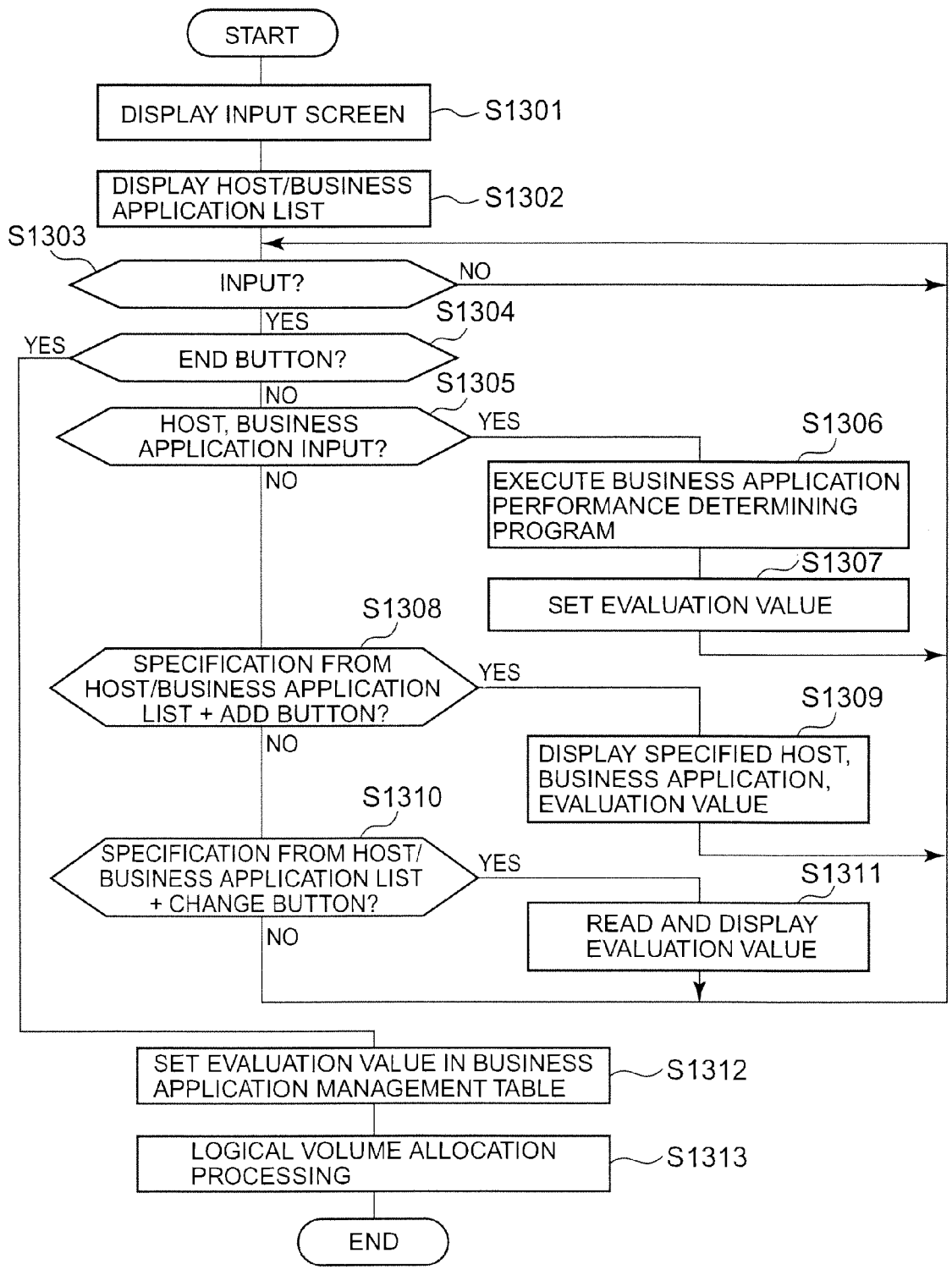
FIG. 13 is a view showing processing for allocating a logical volume.

FIG. 13 is a view showing processing to allocate a logical volume.

This processing is performed by having the manager execute the volume allocating program 202.

First, a setting screen for performing logical volume allocation is displayed (S1301).

Figure 14:
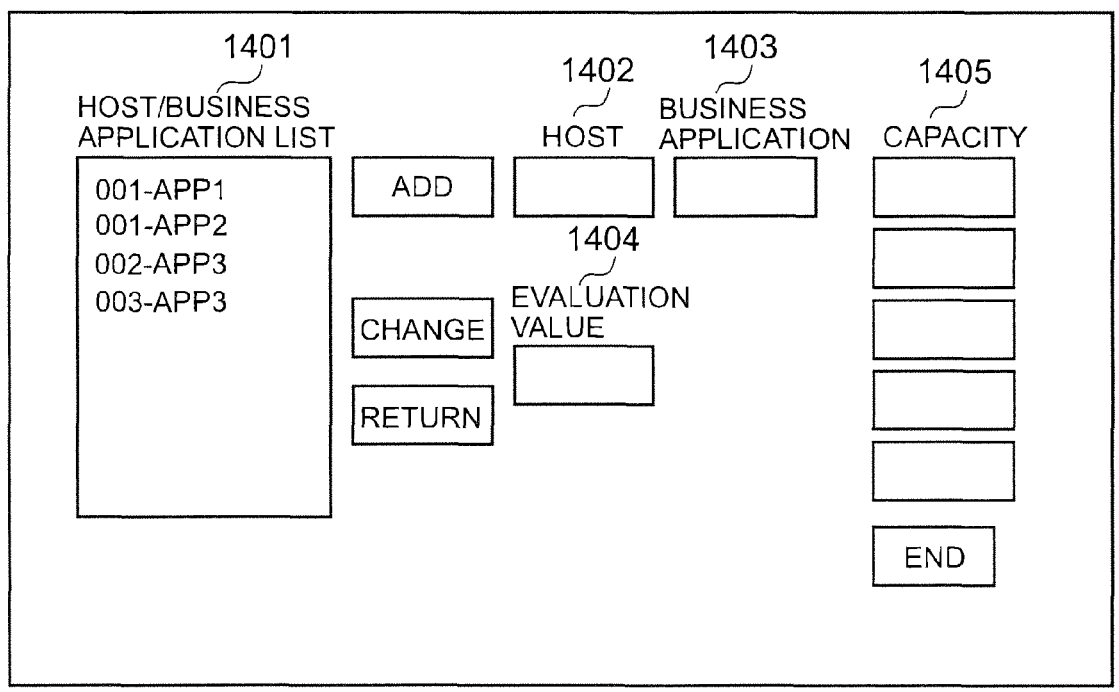
FIG. 14 shows an example of a displayed setting screen.

FIG. 14 shows an example of the displayed setting screen.

A host/business application list 1401, a host 1402, a business application 1403, an evaluation value 1404, a capacity 1405, an add button, a change button, a return button, and an end button are displayed on the setting screen. All of the hosts and business applications set in the business application management table 800 shown in FIG. 8 are displayed in association on the host/business application list 1401. Furthermore, the business applications allocated with a logical volume and the business applications that are not yet allocated with a logical volume are displayed in different colors.

The manager may input a host name and a business application name into the host 1402 and the business application 1403, or the manager may specify a host and business application from the host/business application list 1401 and press the add button such that the specified host and business application are displayed in the host 1402 and business application 1403. In so doing, a business application which is set in the business application management table 800 but not yet allocated with a logical volume, and even a business application which is not set in the business application management table 800, may be specified as a logical volume allocation subject.

The evaluation value 1404 displays the evaluation value of the business application input into the business application 1403. Note, however, that when a logical volume is to be newly allocated, the amount of information relating to the business application is small, and hence the evaluation value may not always be correct. In this case, the evaluation value can be made more accurate using the evaluation value of a related business application, or if the same business application is operative on another host, using the evaluation value thereof. Hence, by specifying a business application from the host/business application list 1401 and pressing the change button, the evaluation value of the specified business application can be displayed in the evaluation value 1404. To return to the original evaluation value, the return button is pressed, and thus the initially displayed evaluation value is again displayed.

A plurality of capacities may be set in the capacity 1403. When a single capacity is set, a single logical volume is allocated, and when a plurality of capacities are set, a plurality of logical volumes are allocated. In other words, the number of set capacities corresponds to the number of allocated logical volumes.

Returning to FIG. 13, logical volume allocation processing will be described.

After the setting screen has been displayed, the hosts 801 and business applications 802 set in the business application management table 800 are displayed on the host/business application list 1401 (S1302). Next, the routine awaits input from the manager (S1303), and when input is provided (Y in S1303), a determination is made as to whether or not the end button has been pressed (S1304).

When the host 1402 and business application 1403 are input (Y in S1305), the business application performance determining program 200 is executed (S1306), and the evaluation value obtained as a result is set as the evaluation value 1404 (S1307). The routine then awaits further input from the manager. When the host 1402 and business application 1403 are input by the manager, it is possible to confirm whether or not the input business application is set in the corresponding host by executing the business application performance determining program 200. If not, nothing is displayed as the business application evaluation value, and no logical volume is allocated.

When a business application displayed on the host/business application list 1401 is specified and the add button is pressed (Y in S1308), the specified business application is displayed as the business application 1403, the host corresponding to the specified business application is displayed as the host 1402, and the evaluation value thereof is displayed as the evaluation value 1404 (S1309).

When a business application displayed on the host/business application list 1401 is specified and the change button is pressed (Y in S1310), the evaluation value of the specified business application is read from the business application management table and set as the evaluation value 1404 (S1311).

When the input does not correspond to any of S1304, S1305, S1308, and S1310, the routine awaits further input from the manager.

When the end button is pressed in S1304, an evaluation value is set in the business application management table 800 (S1312), logical volume allocation processing is performed (S1313), and the processing is terminated.

Figure 15:
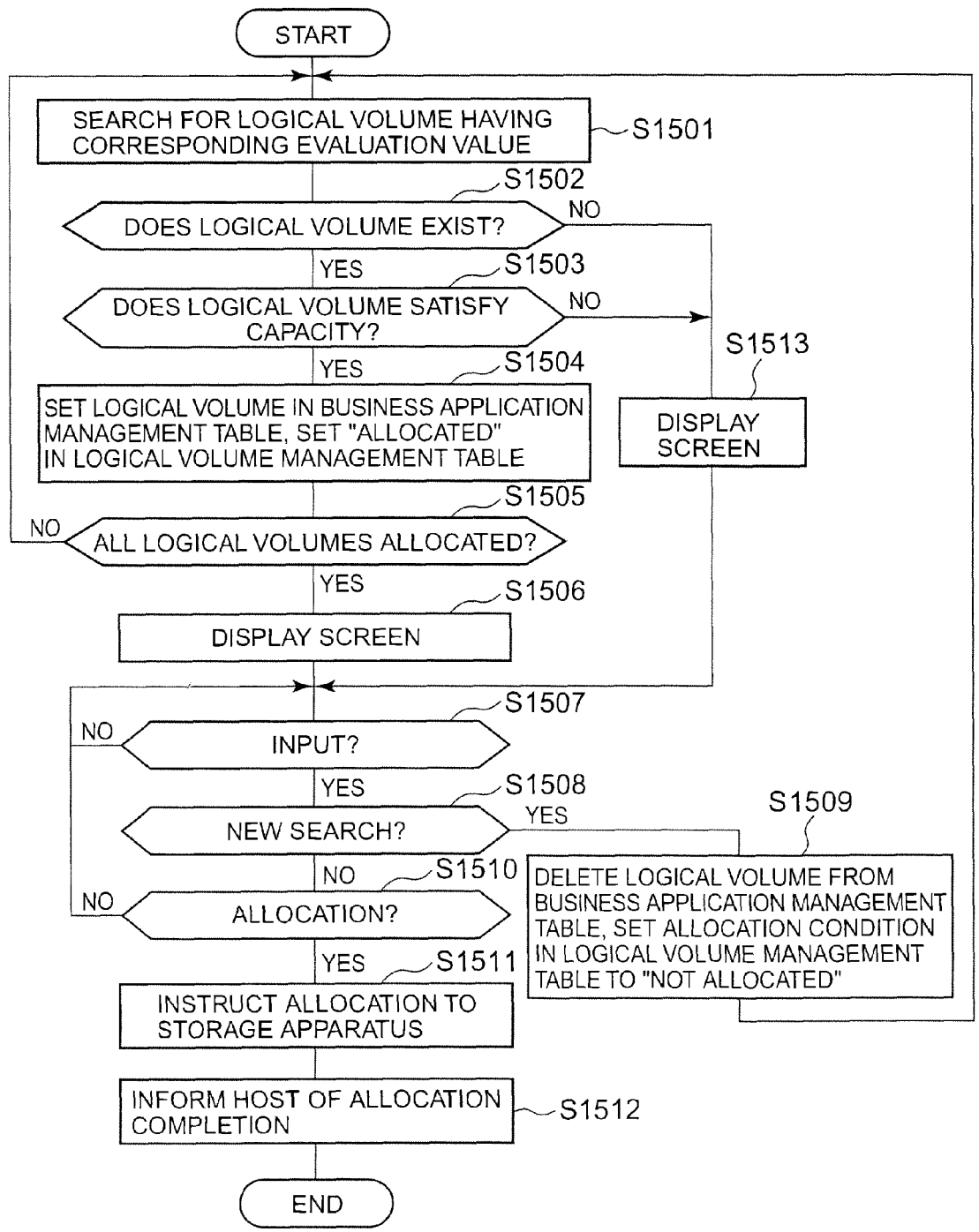
FIG. 15 shows logical volume allocation processing.

FIG. 15 shows logical volume allocation processing.

This processing is also executed by the volume allocating program 202.

First, on the basis of the evaluation value set on the setting screen, a logical volume having a corresponding evaluation value is searched for in the logical volume management table 1100 (S1501). For example, when Level 1 is set, the logical volume management table 1100 is searched from top to bottom to find a Level 1 logical volume. Note that only non-allocated logical volumes are search subjects. When a logical volume having a corresponding evaluation value is found as a result of the search (Y in S1502), a determination is made as to whether or not the logical volume satisfies the capacity set on the setting screen (S1503). If the capacity is satisfied (Y in S1503), the logical volume is set as the logical volume 808 of the business application management table 800, and the allocation condition of the logical volume in the logical volume management table 1100 is set to "allocated" (S1504). Next, a determination is made as to whether or not logical volumes have been allocated to all of the capacities set on the setting screen (S1505), and if logical volumes have not been allocated to all of the capacities (N in S1505), the routine returns to S1501, where a logical volume corresponding to the next capacity is searched for.

When logical volumes have been allocated to all of the capacities in S1505 (Y in S1505), a search result screen is displayed (S1506).

Figure 16:
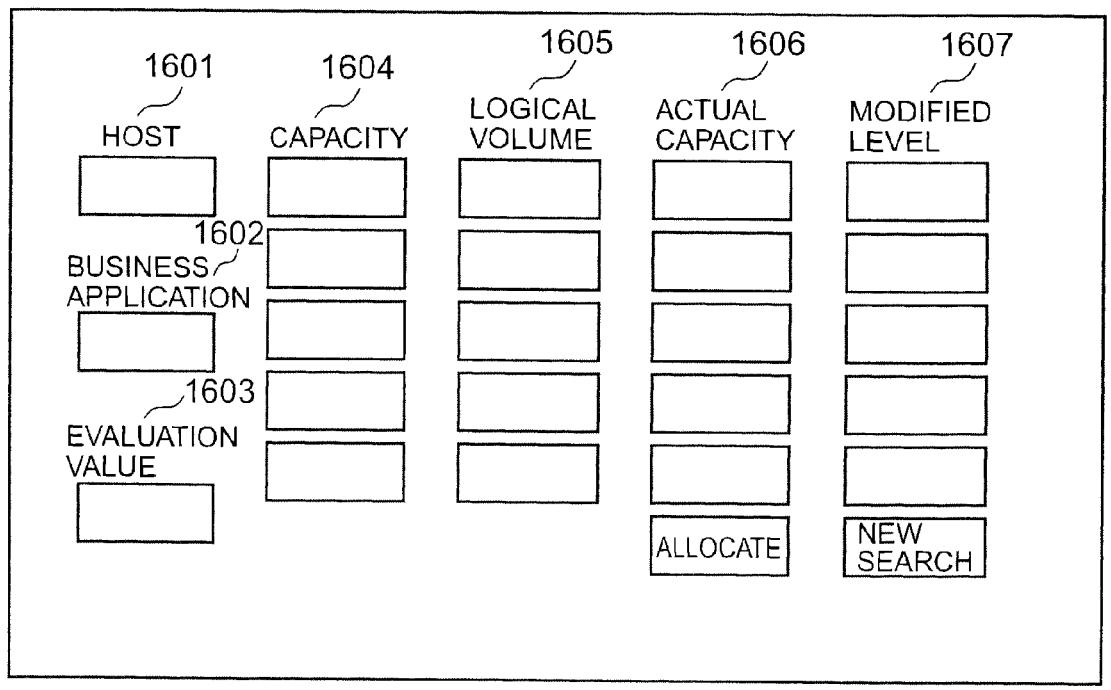
FIG. 16 shows a display example of a search result screen.

FIG. 16 shows a display example of the search result screen.

The search result screen displays a host 1601, a business application 1602, an evaluation value 1603, a capacity 1604, a logical volume 1605, an actual capacity 1606, a modified level 1607, a new search button, and an allocate button.

The host 1601, business application 1602, evaluation value 1603, and capacity 1604 are identical to those displayed as the host 1402, business application 1403, evaluation value 1404, and capacity 1405 of the setting screen shown in FIG. 14. The logical volume 1605 displays the logical volume specified as the allocation subject during the processing of FIG. 15. The actual capacity is the capacity of the logical volume, i.e. the capacity of the logical volume set in the logical volume management table 1100. The modified level 1607 is for inputting a different level when the manager wishes to switch to a volume having a different level.

When the manager presses the new search button, a new logical volume search is executed, and when the manager presses the allocate button, an instruction is issued to allocate the logical volume to a storage apparatus.

Returning to FIG. 15, logical volume allocation processing will be described further.

The routine awaits input from the manager (S1507), and when a new search is indicated (Y in S1508), the logical volume set in the business application management table 800 is deleted and the allocation condition set in the logical volume management table 1100 is set at "not allocated" (S1509). The routine then returns to S1501 and a new volume search is begun.

When the input from the manager indicates allocation (Y in S1510), the logical volume to be allocated to the storage apparatus 110 and the port number of the host are transmitted (S1511), and the host is informed of the completion of allocation (S1512). The processing is then terminated.

The storage apparatus 110 sets the transmitted logical volume and host port number in the memory of the controller. When notification of the allocation of the logical volume is provided by the management server 100, the host 120 transmits a command specifying the host port number and the logical volume to the storage apparatus 110. The logical volume and port number are managed by the storage apparatus 110, and when a command specifying the logical volume is received from the host, the storage apparatus 110 transmits information regarding the logical volume associated with the port number to the host 120. As a result, the host 120 can obtain a logical volume that can be used by the storage apparatus, and the business application 220 can access the logical volume.

When it is determined that no suitable logical volumes exist in S1502 and S1503, the display screen shown in FIG. 16 is displayed (S1513), and the routine awaits input from the manager (S1508). When it is determined that no suitable logical volumes exist in S1502, the message "no logical volumes of corresponding level" is displayed in the logical volume 1605, and when it is determined that no logical volumes which satisfy the capacity exist in S1503, the message "no logical volumes of corresponding capacity" is displayed in the logical volume 1605. In response, the manager resets the capacity or Level, presses the new search button, and searches for another logical volume.

In the processing shown in FIG. 15, the routine waits for an allocation instruction from the manager, but a constitution may be provided whereby the processing of S1511 is begun without waiting for an instruction from the manager when a logical volume to be allocated is found.

Logical volumes are allocated to the business applications in the manner described above.

Note that here, the evaluation value of the business application is determined, but the evaluation value may be determined in units of the files used by the business application. More specifically, by adding file information to the operation information table shown in FIG. 6, the evaluation value can be determined in file units by the business application performance determining program. For example, when a plurality of files belonging to a single business application are stored in different logical volumes, the update time and access pattern are determined in file units. In so doing, a file-related or data-related evaluation value can be determined, and a logical volume can be allocated in accordance with the performance required by the file or data.

When a logical volume is allocated to the business application 220 and the business of the business application 220 is executed, information relating to the business application accumulates such that the evaluation value of the business application 220 may change. A method of reallocating a logical volume when the evaluation value of the business application 220 changes will now be described.

Figure 17:
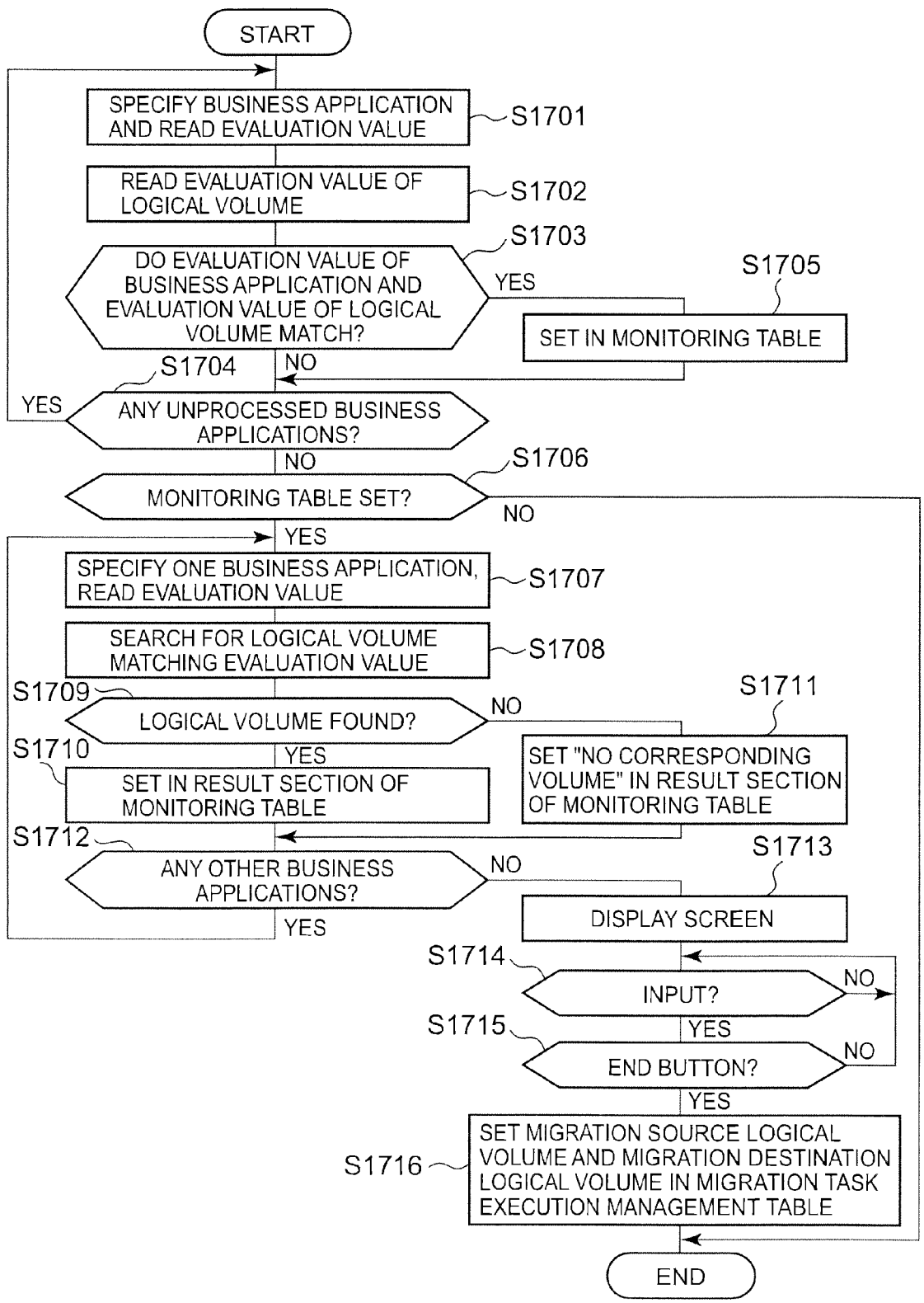
FIG. 17 shows processing for reallocating a logical volume.

FIG. 17 shows processing for reallocating a logical volume.

This processing is executed by the performance monitoring program 203.

The performance monitoring program 203 specifies a business application from the business application management table 800, and reads the evaluation value of the specified business application (S1701). Next, the evaluation value of the logical volume associated with the specified business application is read from the logical volume management table 1100 (S1702). Next, the business application evaluation value and the logical volume evaluation value are compared, and a determination is made as to whether or not the two evaluation values match (S1703). When the evaluation values match, a determination is made as to whether or not the business application has been processed (S1704), and when it is determined that the business application is as yet unprocessed, the routine returns to S1701 and the same processing is performed in relation to another business application. Meanwhile, when the evaluation values do not match in S1703, the business application and the logical volume having non-matching evaluation values are set in the monitoring table 1800 (S1705), whereupon the routine advances to the processing of S1704.

FIG. 18 shows the monitoring table.

When the evaluation value of the business application and the evaluation value of the logical volume associated with the business application do not match, a business application 1801 and a logical volume 1802 are set in the monitoring table 1800. A logical volume having an evaluation value which matches the evaluation value of the business application is set in the search result 1803.

Returning to FIG. 17, logical volume reallocation processing will be described further.

When all of the evaluation values of the business applications and the logical volumes associated with the business applications have been compared (N in S1704), a determination is made as to whether or not the business application 1801 and logical volume 1802 have been set in the monitoring table (S1706). When the business application 1801 and logical volume 1802 have been set, one business application is specified and the evaluation value of the specified business application is read from the business application management table (S1707). Next, a logical volume having an evaluation value which matches the evaluation value of the specified business application and an allocation condition of "not allocated" is searched for in the logical volume management table 1100 (S1708). If such a logical volume is found as a result of the search (Y in S1709), the logical volume is set in the search result 1803 of the monitoring table 1800 (S1710). At this time, the allocation condition of the corresponding logical volume is set to "allocated" in the logical volume management table 1100. On the other hand, if no such logical volume is found (N in S1709), "no corresponding volume" is set in the search result 1803 of the monitoring table.

If a business application for which a logical volume has not yet been found exists in the monitoring table 1800 (Y in S1712), the routine returns to S1707 and performs the processing on another business application. When the processing has been performed for all of the business applications set in the monitoring table 1800 (N in S1713), the results are displayed on the display apparatus of the management server 100 (S1713).

FIG. 19 shows an example of the display of results.

The screen displays a business application 1901, a logical volume 1902 associated with the business application, and a logical volume 1903 which matches the evaluation value of the business application. These items correspond respectively to the business application 1801, logical volume 1802, and search result 1803 set in the monitoring table 1800. When a logical volume is displayed as the logical volume 1903, "move" can be selected. The manager selects "move" to migrate data to the logical volume displayed as the logical volume 1903.

Returning to FIG. 17, logical volume reallocation processing will be described further.

Once the results screen has been displayed in S1713, the routine awaits further input from the manager (S1714). When the manager instructs "end", data migration is performed to the business application for which "move" was selected, and for this purpose, the task execution management table is set (S1715) and the migration task executing program 204 is executed. The processing is then terminated.

FIG. 20 shows the task execution management table.

A task 2001, a volume group 2002, a volume search condition 2003, a task execution timing 2004, a source volume 2005, and a target volume 2006 are set in the task execution management table.

The task 2001 is a task name for managing various tasks, and the volume group 2002 is a group of logical volumes. The volume search condition 2003 is a condition for searching for the target volume 2006. The task execution timing 2004 is a timing for performing migration. The source volume 2005 is a migration source logical volume, and when the volume group 2002 is set, a logical volume belonging to the volume group 2002 is set as the source volume 2005. A case in which migration is performed when the task 2001, task execution timing 2004, source volume 2005, and target volume 2006 are set will now be described. A case in which migration is performed when the volume group 2002 and volume search condition 2003 are set will be described thereafter.

The task management table setting of S1715 is performed by setting the task 2001, setting the logical volume displayed in the logical volume 1902 selected for movement as the source volume 2005, and setting the logical volume displayed in the logical volume 1903 as the target volume 2006. The task execution timing 2004 is set as "execute immediately". Thus, a task is set for each business application for which "move" has been specified.

Figure 21:
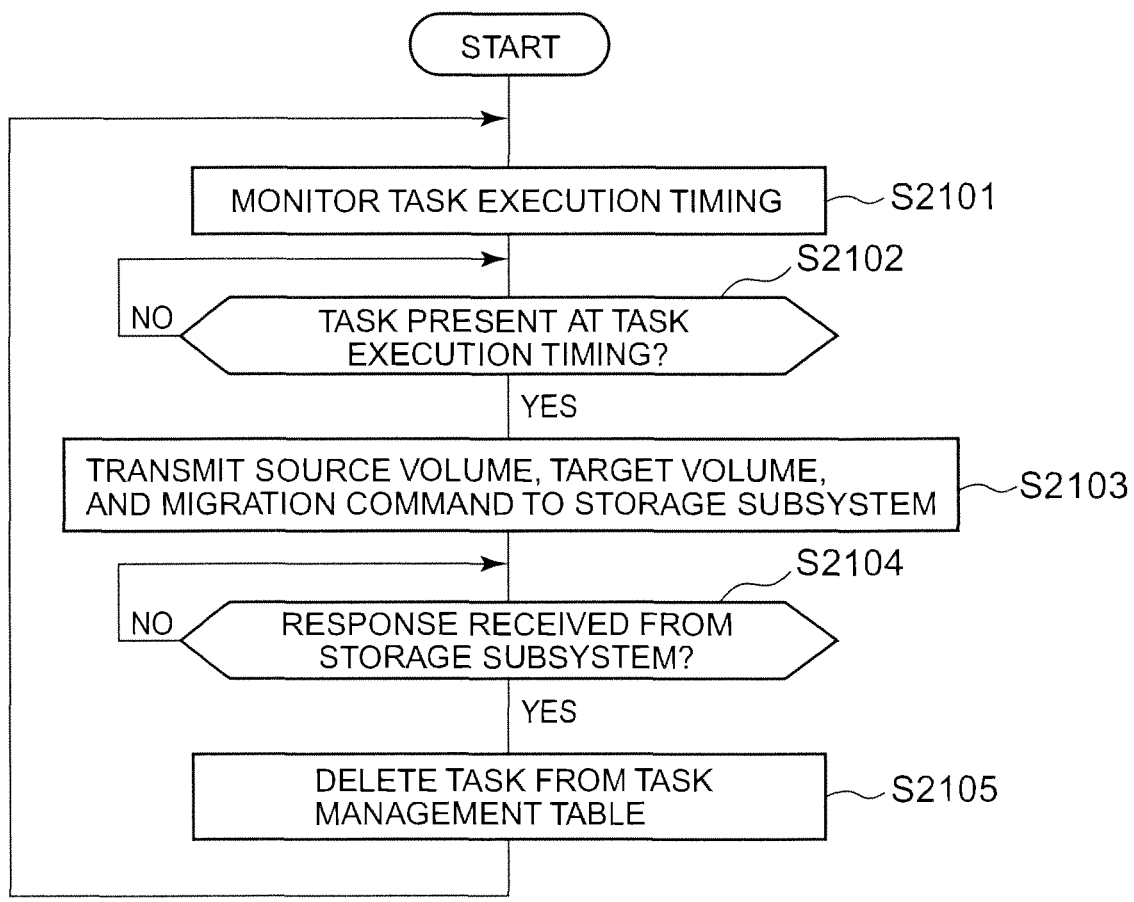
FIG. 21 shows processing for executing a migration.

FIG. 21 shows processing for executing migration.

This processing is executed by the migration task executing program 204.

First, the task execution timing set in the task management table is monitored (S2101), and when a task exists at the execution timing (S2102), the source volume, the target volume, and a migration command are transmitted to a storage subsystem (S2103). Upon reception of notification of the completion of migration from the storage subsystem (Y in S2104), the task is deleted from the task management table (S2105), whereupon the routine returns to S2102 and the task execution timing is monitored.

As described above, when the business application evaluation value and the logical volume evaluation value do not match, a logical volume is selected by the performance monitoring program 203 on the basis of the business application evaluation value, and data are moved thereto. Note that in S1713 to S1715, the manager determines whether or not to perform migration, but this processing may be eliminated, and data migration may be performed automatically by executing S1716 when a business application and a logical volume have been set in the monitoring table 1800.

Next, a case in which data migration is performed in accordance with an instruction from the manager will be described. Here, a volume group comprising a plurality of logical volumes can be defined such that migration can be performed in volume group units, rather than performing migration by specifying logical volumes one by one. In so doing, the load on the manager is reduced.

Figure 22:
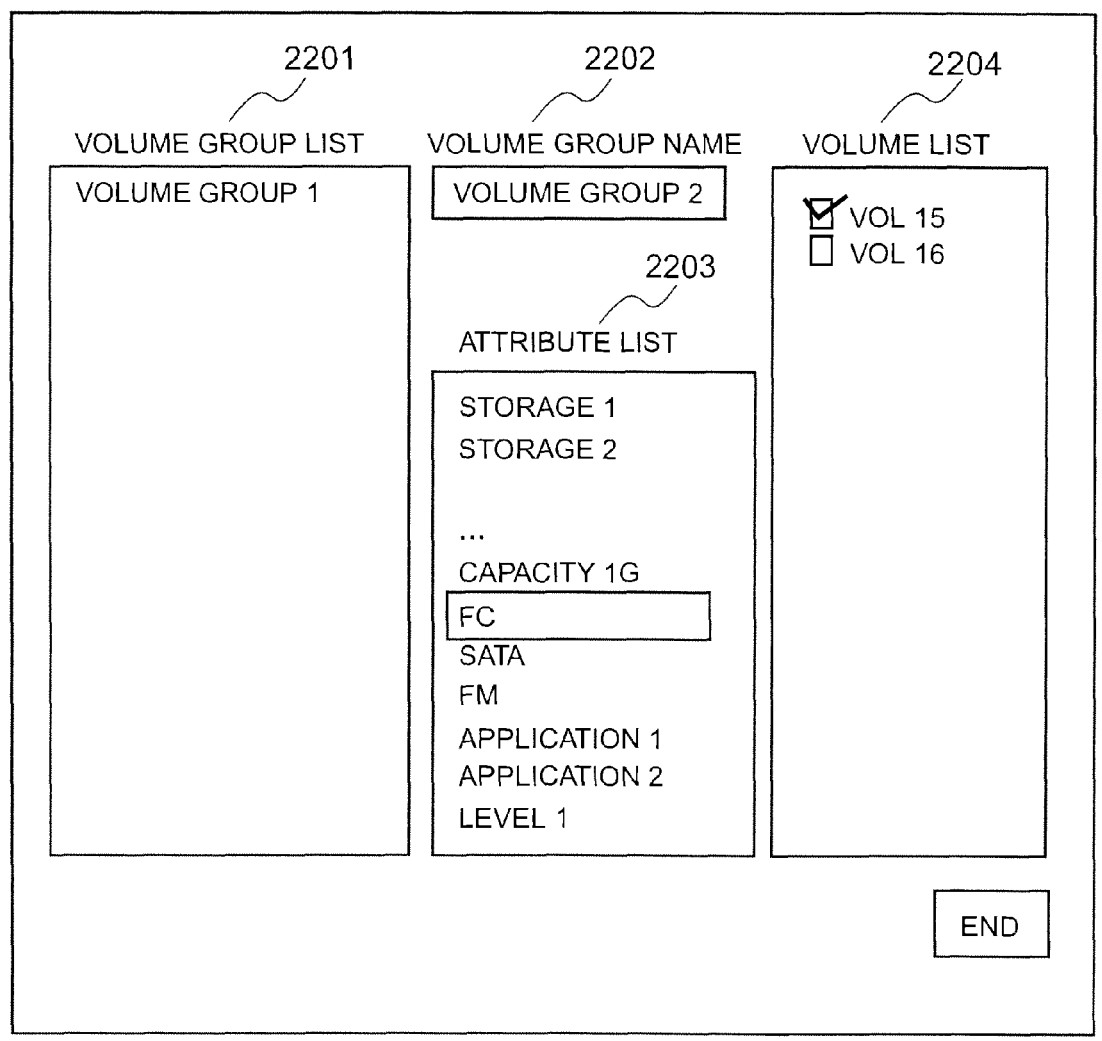
FIG. 22 shows a volume group generating and editing screen.

FIG. 22 shows an example of a display screen for generating or editing a volume group.

This display screen displays a volume group list 2201, a volume group name 2202, an attribute list 2203, a volume list 2204, and an end button.

The volume group list 2201 displays volume groups set in a volume group management table to be described below.

The volume group name 2202 is an area into which the manager inputs a newly set or modified volume group name.

The attribute list 2203 displays the attributes set in the logical volume management table 1100 shown in FIG. 11 and the business applications set in the business application management table 800 shown in FIG. 8. The logical volume evaluation value and the business application evaluation value may also be set as attributes. Thus, the attributes displayed on the attribute list 2203 may be set freely, and hence all of the attributes in the logical volume management table 1100 shown in FIG. 11 or a part thereof may be used.

The volume list 2204 displays logical volumes having the attributes specified on the attribute list 2203, and the logical volumes of a set volume group.

Figure 23:
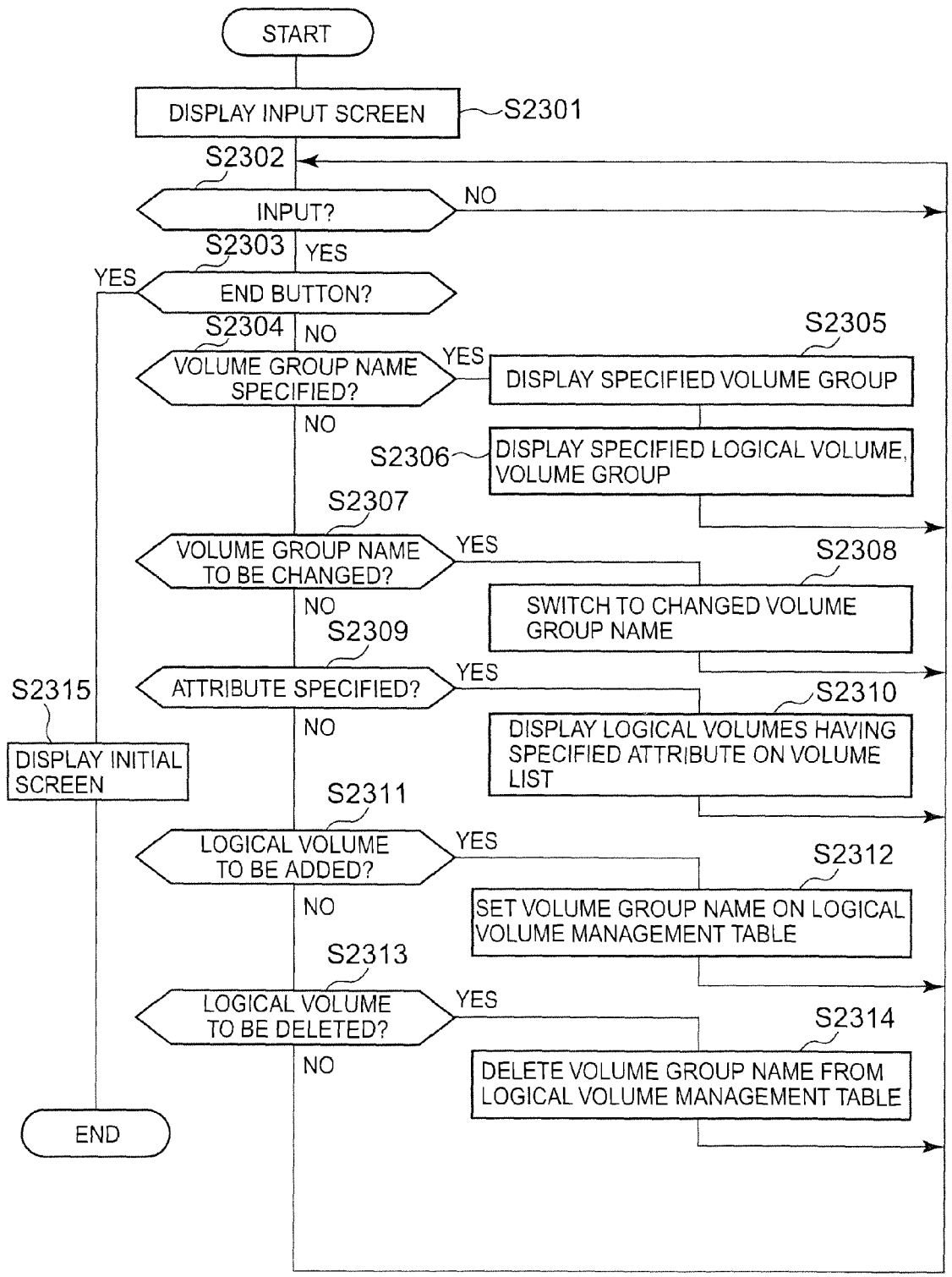
FIG. 23 shows volume group setting/editing processing.

FIG. 23 shows an example of processing for setting/editing a volume group.

This processing is performed when the volume group generating program 205 is executed by the manager.

First, the screen shown in FIG. 22 is displayed on the display apparatus of the management server 100 (S2301). At this stage, no volume groups have been specified, and therefore nothing is displayed in the volume group name 2202. Next, the routine awaits input from the manager (S2302). When input is provided, a determination is made as to whether or not the end button has been pressed (S2103). If the end button has been pressed, the processing is terminated.

When a volume group displayed on the volume group list 2201 is specified (Y in S2304), the specified volume group is displayed in the volume group name 2202 (S2305). Next, using the volume group specified from the volume group management table as a key, the specified logical volume and the volume group are displayed on the volume list 2205 (S2306). The routine then awaits further input from the manager.

When the name of the volume group is to be changed (Y in S2307), the volume group set in the volume group management table and specified on the volume group list is changed to the volume group input into the volume group name 2202 (S2308), whereupon the routine awaits further input from the manager. Note that in S2307, the manager inputs the volume group name 2202, the volume group specified on the volume group list 2201 is compared to the volume group input into the volume group name 2202, and a determination is made as to whether or not the volume group name has changed. If the volume groups match, it is determined that the volume group name has not changed, and if the volume groups do not match, it is determined that the volume group name has changed.

When an attribute is specified (Y in S2309), logical volumes having the specified attribute are displayed on the volume list 2205 from the logical volume management table 1100 or the business application management table 800 (S2310), whereupon the routine awaits further input from the manager.

If volume addition is indicated (a check mark is inserted in a check box) (Y in S2311), a logical volume is set in the volume group management table (S2312), whereupon the routine awaits further input from the manager.

If volume deletion is indicated (the check mark is deleted from the check box) (Y in S2313), the corresponding logical volume is deleted from the volume group management table (S2314), whereupon the routine awaits further input from the manager.

Figures 24, 25:
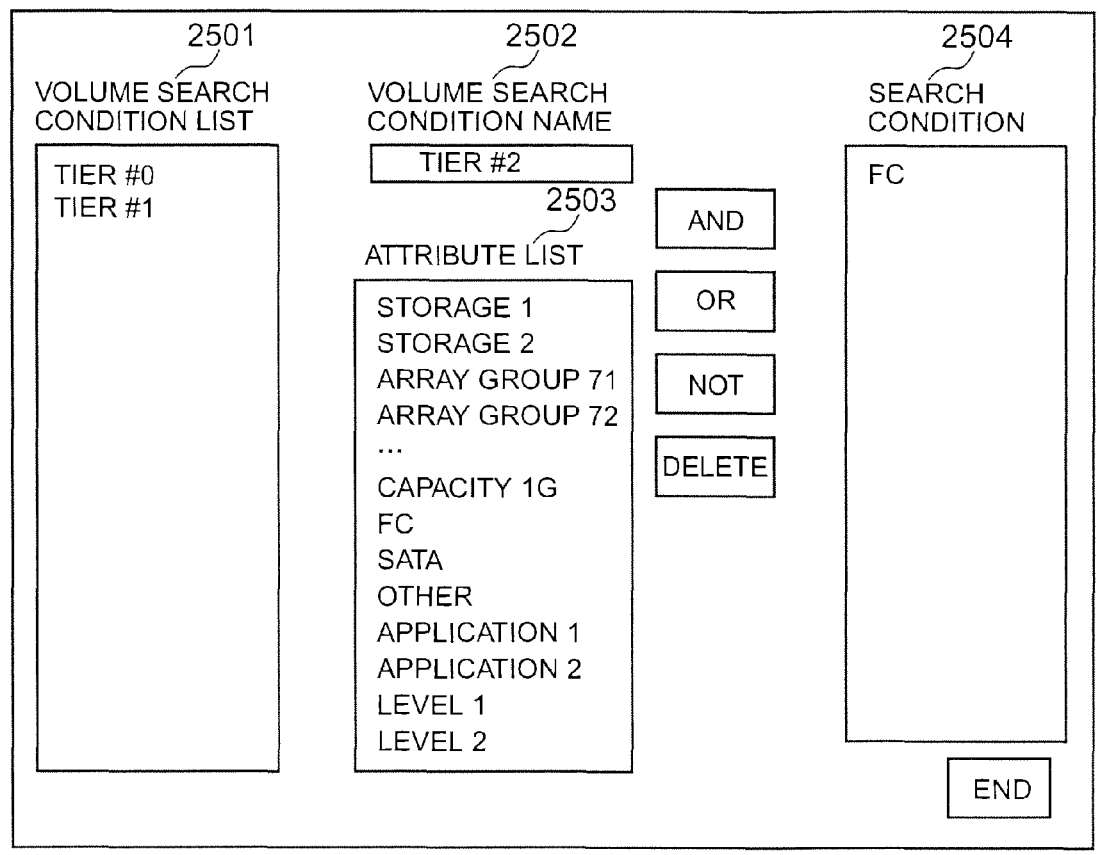
FIG. 24 shows a volume group management table.
FIG. 25 shows a volume search condition generating and editing screen.

FIG. 24 shows the volume group management table.

A volume group 2401, i.e. a volume group name, and a logical volume 2402 belonging to the volume group are set in the volume group management table. The volume group set as the volume group 2401 is displayed on the volume group list 2201 of FIG. 22.

When a logical volume has been added or deleted in S2312 or S2314, the logical volume is added to or deleted from the volume group management table.

Next, a case in which the manager generates and edits the volume search condition will be described.

FIG. 25 shows an example of a display screen for generating and editing the volume search condition. A volume search condition list 2501, a volume search condition name 2502, an attribute list 2503, a search condition 2504, logical condition buttons (an AND button, an OR button, and a NOR button), a delete button, and an end button are displayed on the display apparatus of the management server 100.

Volume search conditions set in FIG. 26, to be described below, are displayed on the volume search condition list 2501. The volume search condition name 2502 displays the name of a search condition input by the manager or the name of a preset search condition. The attributes of the logical volume management table are displayed on the attribute list 2503. An attribute and a logical condition set via the attribute list 2503 and logical condition buttons are displayed as the search condition 2504.

FIG. 26 shows an example of the volume search condition management table.

A volume search condition 2601 and a search condition 2602 are set on the volume search condition management table 2600. The volume search condition 2601 is the volume search condition name 2502 input by the manager onto the screen shown in FIG. 25, while the attribute and logical condition input by the manager are set as the search condition 2602.

Figure 27:
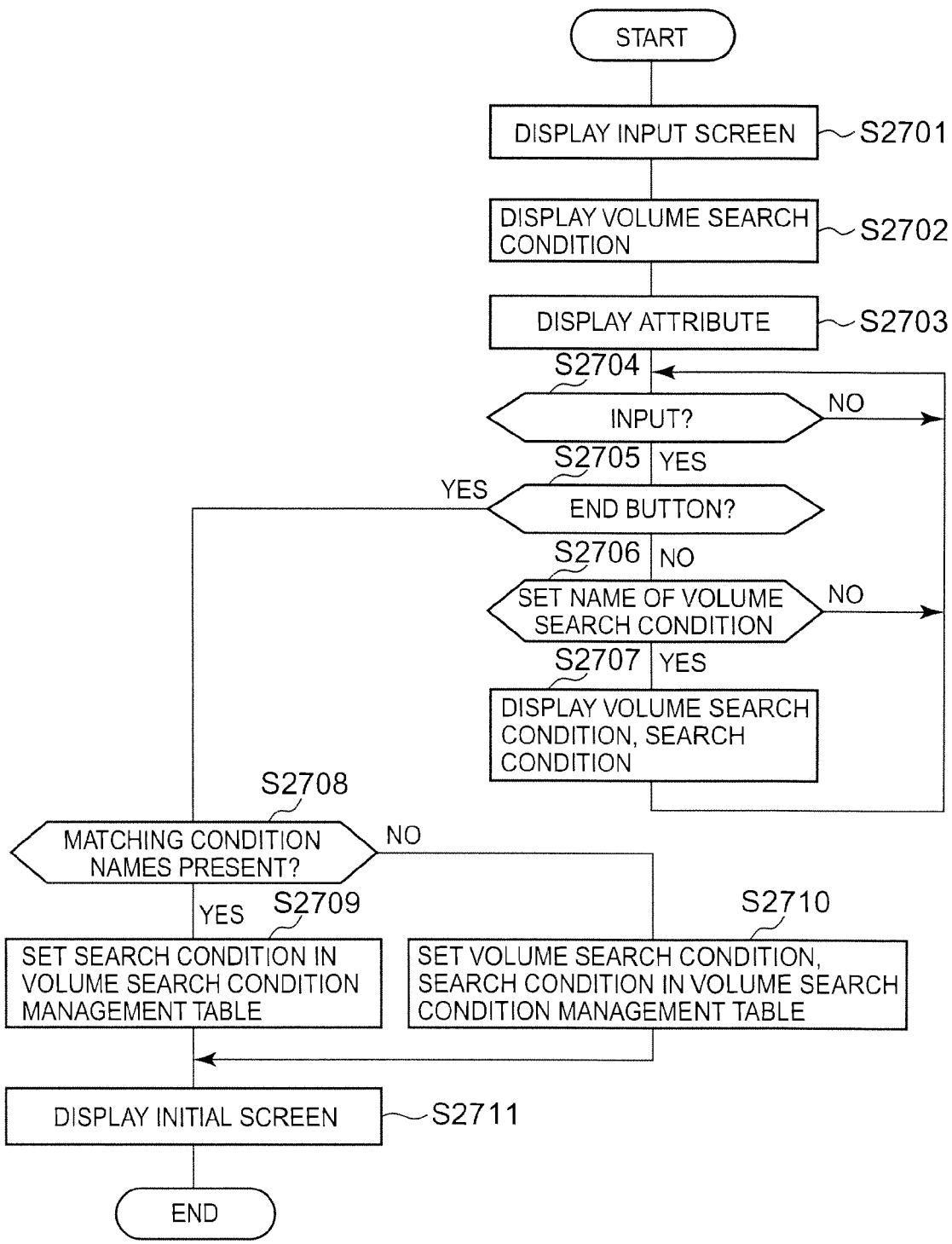
FIG. 27 shows volume search condition generating and editing processing.

FIG. 27 shows processing for generating or editing a volume search condition.

This processing is executed by having the manager execute the volume search condition generating program 206.

First, the screen shown in FIG. 25 is displayed on the display apparatus of the management server 100 (S2701). Next, the volume search condition management table 2600 is searched, and when a volume search condition has been set, the volume search condition is displayed on the search condition list 2501 (S2702). The attributes set in the logical volume management table 1100 are displayed on the attribute list 2503 (S2703). Next, the routine awaits input from the manager (S2704). When input is provided, a determination is made as to whether or not the end button has been pressed (S2705).

When the manager input indicates a volume search condition displayed on the volume search condition list 2501 (Y in S2706), the specified volume search condition is displayed in the volume search condition name 2502, and the search condition corresponding to the specified volume search condition is read from the volume search condition management table 2600 and displayed as the search condition 2504 (S2707).

When the manager input of S2705 indicates the end button (Y in S2705), a determination is made as to whether or not a volume search condition which matches the name input into the volume search condition name 2502 exists in the volume search condition management table 2600 (S2708). If a matching volume search condition exists (Y in S2708), the search condition set as the search condition 2504 is set in the volume search condition management table 2600 (S2709). If no matching name exists (N in S2708), the input volume search condition and the input search condition are set in the volume search condition management table (S2709). The processing is then terminated.

Next, a migration task for migrating a volume will be described.

Figure 28:
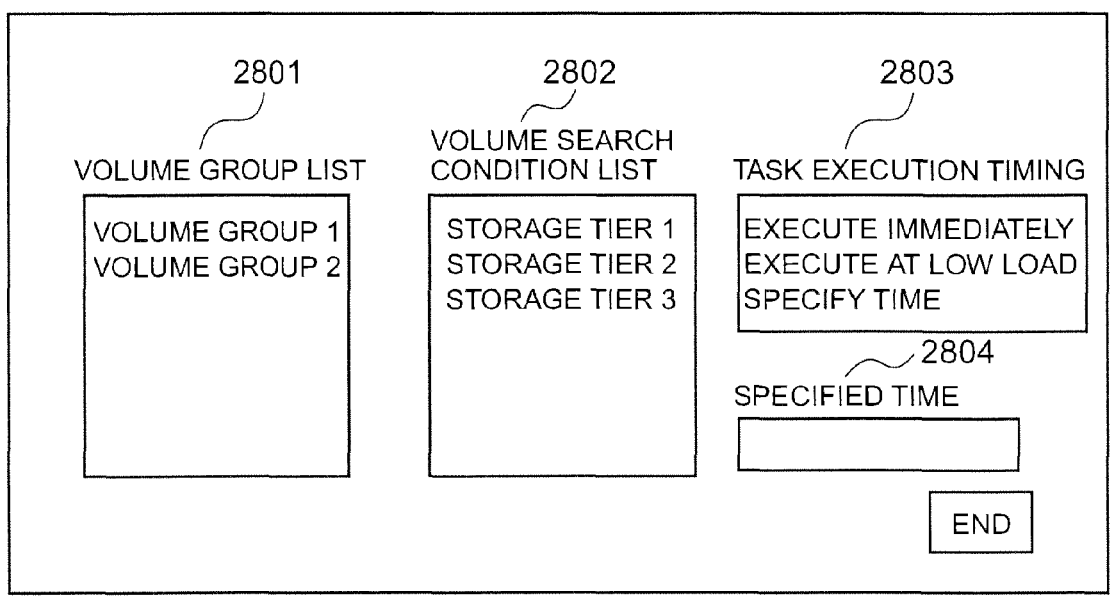
FIG. 28 is a view showing a setting screen for executing a migration task.

FIG. 28 shows an example of a setting screen for executing the migration task.

A volume group list 2801, a volume search condition list 2802, a task execution timing 2803, a specified time 2804, and an end button are displayed on the display apparatus of the management server 100.

The volume group names set in the logical volume management table 1100 are displayed in the volume group list 2801. The volume search conditions set in the volume search condition management table 2600 are displayed on the volume search condition list 2802. The manager specifies a volume group from the volume group list 2801 and a search condition from the volume search condition list 2302, specifies the task execution timing 2803, and presses the end button. As a result, a data migration task is set in the task management table. Here, the term "execute immediately" means that the task is executed immediately after generation. The term "execute at low load" indicates that the load of the storage apparatus is monitored in the management server 100 and the task is executed when the load falls below a threshold. In this case, the manager sets the threshold in the storage resource 102. The term "specify time" means that the task is executed at a time input into the specified time 2804.

Figure 29:
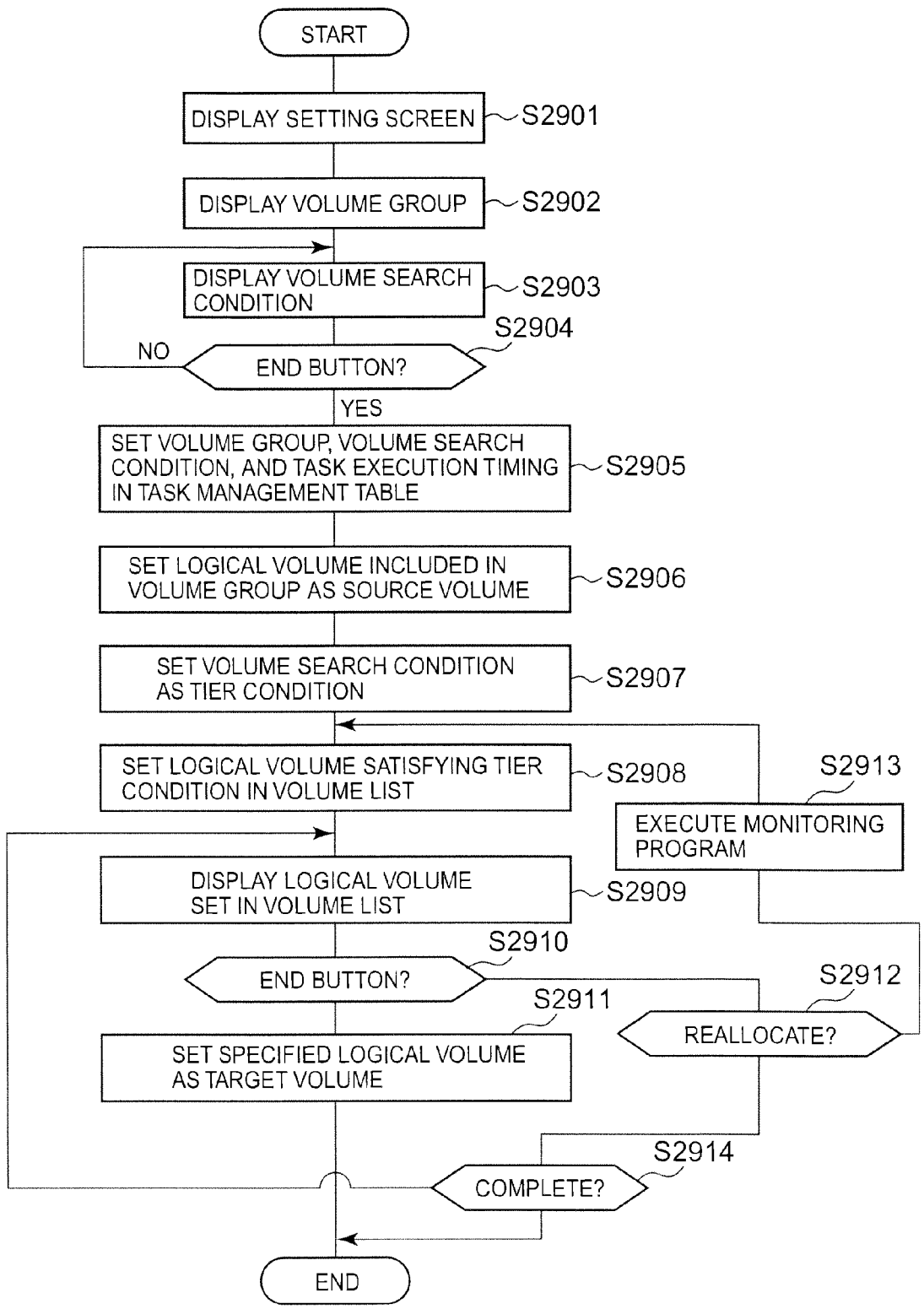
FIG. 29 shows processing for generating a migration task.

FIG. 29 shows processing for generating a migration task.

This processing is performed by having the manager execute the migration task generating program 207. Note that in the description of this processing, the Tier Condition and Volume List are variables used in processing performed by the CPU of the management server 100, and the data set in the variables are stored in the internal storage resource of the CPU.

First, the screen shown in FIG. 28 is displayed on the display apparatus of the management server 100 (S2901). Next, the volume group set in the volume group management table 2400 is read and displayed on the volume group list 2601 (S2902). Next, the volume search condition is read from the volume search condition management table 2600 and displayed on the volume search condition list 2602 (S2903). The routine then waits for the manager to press the end button (S2904). When the manager presses the end button (Y in S2904), the specified volume group, volume search condition, and task execution timing are set in the task execution management table 2000 (S2905). Next, a logical volume set in the specified volume group is specified from the volume group management table 2400 and set as the source volume 2005 of the task execution management table 2000 (S2906).

Next, a search condition corresponding to the volume search condition specified from the volume search condition management table 2600 is read and set as the Tier Condition (S2907).

Next, a logical volume which satisfies the newly set search condition (the search condition set as the Tier Condition) is specified from the logical volume management table 1100, and the specified logical volume is set in the Volume List (S2908). Here, the specified logical volume has an allocation condition of "not allocated", a capacity that is equal to or greater than that of the migration source logical volume, and satisfies the newly set search condition.

The logical volume list set in the Volume List is displayed on the display apparatus of the management server 100 (S2909).

Figure 30:
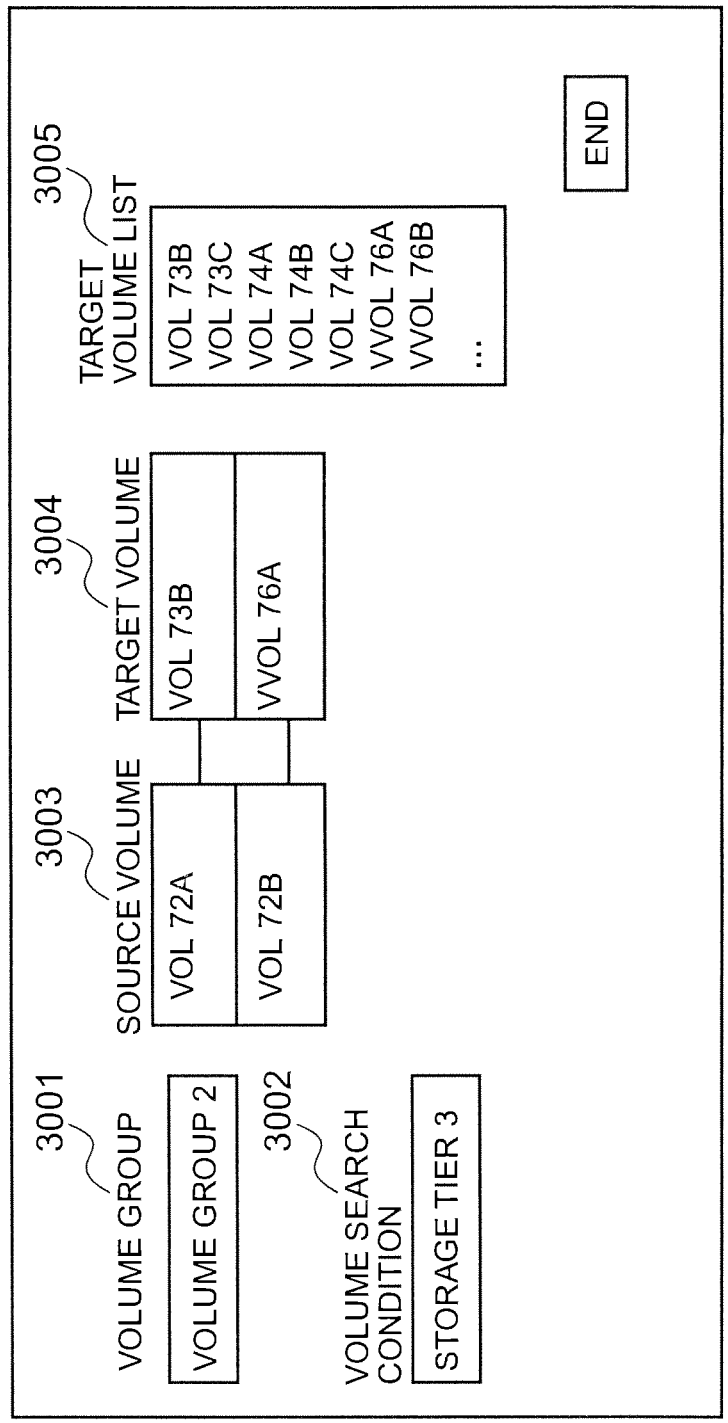
FIG. 30 is a logical volume display screen.

FIG. 30 shows an example of a screen displaying the logical volumes specified according to the volume search condition in the processing of S2909. The display screen displays a volume group 3001, a volume search condition 3002, a source volume 3003, a target volume 3004, a target volume list 3005, and an end button. The volume group 3001 and volume search condition 3002 display the specified volume group and volume search condition. The source volume 3003 displays a logical volumes belonging to the specified volume group. The target volume list 3005 displays the logical volumes set in the Volume List. Note that when no logical volumes satisfy the volume search condition in S2908, nothing is displayed in the target volume list 3005. The target volume 3004 is displayed by having the manager select a logical volume from among the logical volumes displayed on the target volume list 3005. After setting the target volume, the manager presses the end button.

The processing of FIG. 29 will now be described further.

When the end button is pressed (Y in S2910), the specified logical volume is set as the target volume of the task management table (S2911), whereupon the migration task executing program 204 is executed. The processing is then terminated. The processing of the migration task executing program 204 is described above with reference to FIG. 21.

On the other hand, when a rearrange button is pressed, the performance monitoring program 203 is executed. If a logical volume that does not match the evaluation value of the business application is found, the data are moved to a different logical volume. As a result, space is made available in the logical volume, and therefore, by performing S2708 again, a logical volume may be found.

When the end button is pressed, the processing is terminated.

Next, a case in which data migration is performed on the basis of the relationship between logical volumes will be described. The storage apparatus is used to store data, and to enhance the storage reliability, data backup may be performed. In this case, two logical volumes form a pair in which one of the logical volumes serves as a data-storing logical volume that is accessed by the host (to be referred to as a "primary logical volume" hereafter), and the other logical volume (to be referred to as a "secondary logical volume" hereafter) stores a copy of the data stored in the primary logical volume. In so doing, the data in the secondary logical volume can be used to resume business when a defect occurs in the primary logical volume. In this case, the data stored in the primary logical volume are also stored in the secondary logical volume, and here, a synchronous format and an asynchronous format may be used. In the synchronous format, data are typically stored in both the primary logical volume and the secondary logical volume, whereupon a response indicating that the data have been stored is transmitted to the host. In the asynchronous format, on the other hand, data are stored in the primary logical volume, a response is transmitted to the host, and then the data are stored in the secondary logical volume. Hence, in the synchronous format, the performance of the secondary logical volume needs to be equal to the performance of the primary logical volume, whereas in the asynchronous format, the performance of the secondary logical volume does not need to be equal to that of the primary logical volume. For this reason, data rearrangement is performed in relation to logical volumes having a pair relationship.

FIG. 31 shows a logical volume pair definition table.

A copy name 3101, a primary logical volume 3102, a secondary logical volume 3103, and a copy format 3104 are set in the pair definition table. A storage apparatus is also set in the pair definition table 3100, and when the primary logical volume is accessed, data are stored in the secondary logical volume by referring to the pair definition table.

Figure 32:
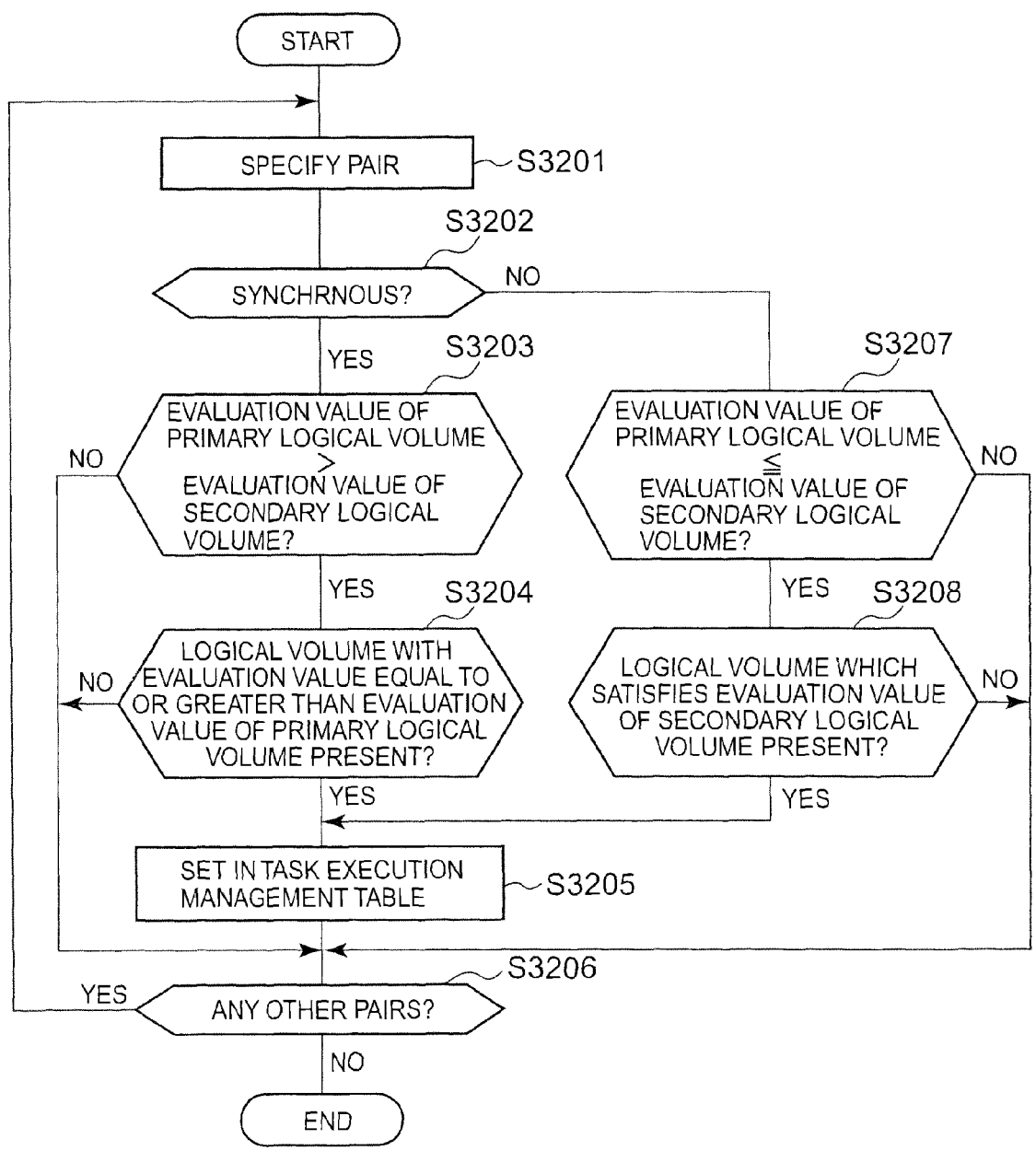
FIG. 32 is a view showing rearrangement processing.

FIG. 32 shows data rearrangement processing.

This processing is performed by having the manager execute the pair monitoring program.

First, a single pair is specified from the pair definition table 3100 (S3201), and a determination is made as to whether or not the copy format of the specified pair is synchronous or asynchronous (S3202). When the synchronous format is employed, the evaluation values of the primary logical volume and secondary logical volume are read from the logical volume management table 1100 and compared (S3203). If the evaluation value of the secondary logical volume is lower than the evaluation value of the primary logical volume, a logical volume having an evaluation value that is equal to or greater than the evaluation value of the primary logical volume is specified from the logical volume management table 1100. When a logical volume having an evaluation value that is equal to or greater than the evaluation value of the primary logical volume exists (Y in S3204), the logical volume is set in the migration task management table. More specifically, the secondary logical volume is set as the source volume, the specified logical volume is set as the target volume, and "execute immediately" is set as the task execution timing.

When unprocessed pairs exist in the pair definition table 3100, the routine returns to S3201, and similar processing is performed on another pair.

On the other hand, when the format is determined to be "asynchronous" in S3202, a determination is made as to whether or not the evaluation value of the primary logical volume>the evaluation value of the secondary logical volume (S3207). When the evaluation value of the primary logical volume>the evaluation value of the secondary logical volume (Y in S3207), the routine advances to S3206. On the other hand, when the evaluation value of the primary logical volume≤the evaluation value of the secondary logical volume (N in S3207), a logical volume having an evaluation value that is lower than the evaluation value of the primary logical volume is specified from the logical volume management table. When a logical volume having an evaluation value that is lower than the evaluation value of the primary logical volume exists (Y in S3208), the routine advances to S3205, where the migration management table is set, and when no such logical volume exists (N in S3208), the routine advances to S3206. When it is determined in S3206 that all pairs have been processed (Y in S3206), the migration task executing program 204 is executed, whereupon the processing is terminated.

As described above, the logical volume evaluation value may be determined from one or a combination of the rotation speed, RAID level, disk type, response speed, and access frequency. Here, the evaluation value is determined in order to classify the performances of a plurality of logical volumes. Hence, if the logical volume is classified according to one of the rotation speed, RAID level, disk type, response speed, and access frequency, the logical volume may be evaluated using the value thereof instead of calculating the evaluation value.

What is claimed is:

1. A data migration method for migrating data stored in a storage area, from among a plurality of storage areas provided in a storage apparatus, to another storage area, comprising the steps of:

specifying a first storage area serving as a data writing and reading subject in relation to a host computer, and a second storage area in which a copy of data stored in said first storage area is stored, and determining a performance of said first storage area and a performance of said second storage area, and when said performance of said second storage area is lower than said performance of said first storage area, specifying a storage area having a higher or equal performance than said performance of said first storage area from said storage areas provided in said storage apparatus, migrating data stored in said second storage area to said specified storage area, and storing a copy of said data stored in said first storage area in said specified storage area serving as a new second storage area.

2. The data migration method according to claim 1, wherein data are stored in said first storage area and said second storage area synchronously.

3. A storage system comprising a host computer having an application, a storage apparatus having a plurality of storage areas, and a management server, wherein said management server comprises a control unit configured to determine a first level of performance of said application executed by said host computer from a plurality of levels of performance of said application, by dynamically evaluating operation information relating to said application, to determine a second level of performance of each of said storage areas provided in said storage apparatus from a plurality of levels of performance of said storage area, by evaluating attributes of said storage areas, to specify a storage area which satisfies said performance of said application based on said first level of performance of said application and said second level of performance of said storage areas, and to transmit information relating to said specified storage area and said host computer on which said application is executed to said storage apparatus, wherein said control unit of said management server is configured to specify a first storage area serving as a data writing and reading subject in relation to said host computer, and a second storage area in which a copy of data stored in said first storage area is stored, to determine a performance level of said first storage area and a performance level of said second storage area, and when said performance level of said second storage area is lower than said performance level of said first storage area, said control unit is configured to specify a storage area having a higher or equal performance level than said performance level of said first storage area from said storage areas provided in said storage apparatus, to instruct said storage apparatus to migrate data stored in said second storage area to said specified storage area, and to instruct said storage apparatus to store a copy of said data stored in said first storage area in said specified storage area serving as a new second storage area.

4. The storage system according to claim 3, wherein data are stored in said first storage area and said second storage area synchronously.

* * * * *